(12) United States Patent
Sinn et al.

(10) Patent No.: US 11,479,950 B2
(45) Date of Patent: Oct. 25, 2022

(54) WORK IMPLEMENT ASSEMBLY USING A LOAD SHARING BLOCK WITH AN ARCUATE PROFILE

(71) Applicant: Caterpillar Inc., Deerfield, IL (US)

(72) Inventors: Eric T. Sinn, Tremont, IL (US); Douglas C. Serrurier, Morton, IL (US); Rammagy Yoeu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 670 days.

(21) Appl. No.: 16/295,180

(22) Filed: Mar. 7, 2019

(65) Prior Publication Data

US 2020/0157778 A1 May 21, 2020

Related U.S. Application Data

(60) Provisional application No. 62/768,403, filed on Nov. 16, 2018.

(51) Int. Cl.
*F16B 1/00* (2006.01)
*E02F 9/28* (2006.01)
*E02F 3/40* (2006.01)

(52) U.S. Cl.
CPC .............. *E02F 9/2825* (2013.01); *E02F 3/40* (2013.01); *E02F 9/285* (2013.01); *E02F 9/2808* (2013.01); *E02F 9/2858* (2013.01); *E02F 9/2883* (2013.01); *E02F 9/2891* (2013.01); *F16B 1/00* (2013.01); *F16F 2230/02* (2013.01)

(58) Field of Classification Search
CPC combination set(s) only.
See application file for complete search history.

(56) References Cited

U.S. PATENT DOCUMENTS

| 2,427,651 | A | * | 9/1947 | Baer | E02F 9/2841 37/457 |
|---|---|---|---|---|---|
| 5,465,512 | A | * | 11/1995 | Livesay | E02F 9/2825 37/455 |
| 5,553,409 | A | * | 9/1996 | Irving | A01B 15/02 172/719 |
| 6,986,216 | B2 | | 1/2006 | Emrich et al. | |
| 7,526,886 | B2 | | 5/2009 | McClanahan et al. | |
| RE42,629 | E | | 8/2011 | Jones et al. | |
| 8,800,178 | B2 | * | 8/2014 | Rol Corredor | E02F 9/2858 37/456 |
| 9,512,600 | B2 | | 12/2016 | Briscoe et al. | |
| 9,562,347 | B2 | | 2/2017 | Clendenning et al. | |
| 10,119,252 | B2 | | 11/2018 | Campomanes | |
| 2017/0145664 | A1 | * | 5/2017 | Campomanes | E02F 9/2883 |

OTHER PUBLICATIONS

U.S. Appl. No. 29/682,759, filed Mar. 7, 2019. (Unpublished).
U.S. Appl. No. 29/682,757, filed Mar. 7, 2019. (Unpublished).
U.S. Appl. No. 29/682,767, filed Mar. 7, 2019. (Unpublished).
U.S. Appl. No. 29/682,763, filed Mar. 7, 2019. (Unpublished).

* cited by examiner

*Primary Examiner* — Monica E Millner
(74) *Attorney, Agent, or Firm* — Law Office of Kurt J. Fugman LLC

(57) ABSTRACT

A load sharing block includes a body including a flat outer surface defining a first end and a second end, a first arcuate outer portion extending from the first end of the flat outer surface, and a second arcuate outer portion extending from the second end of the flat outer surface. The first arcuate outer portion terminates at a first free end and includes a first elliptical outer surface extending from the first free end.

20 Claims, 20 Drawing Sheets

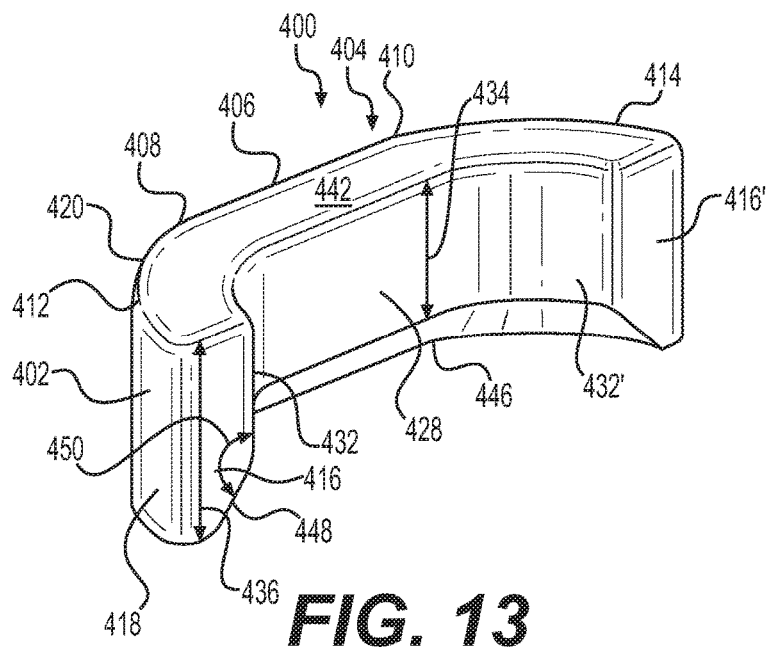
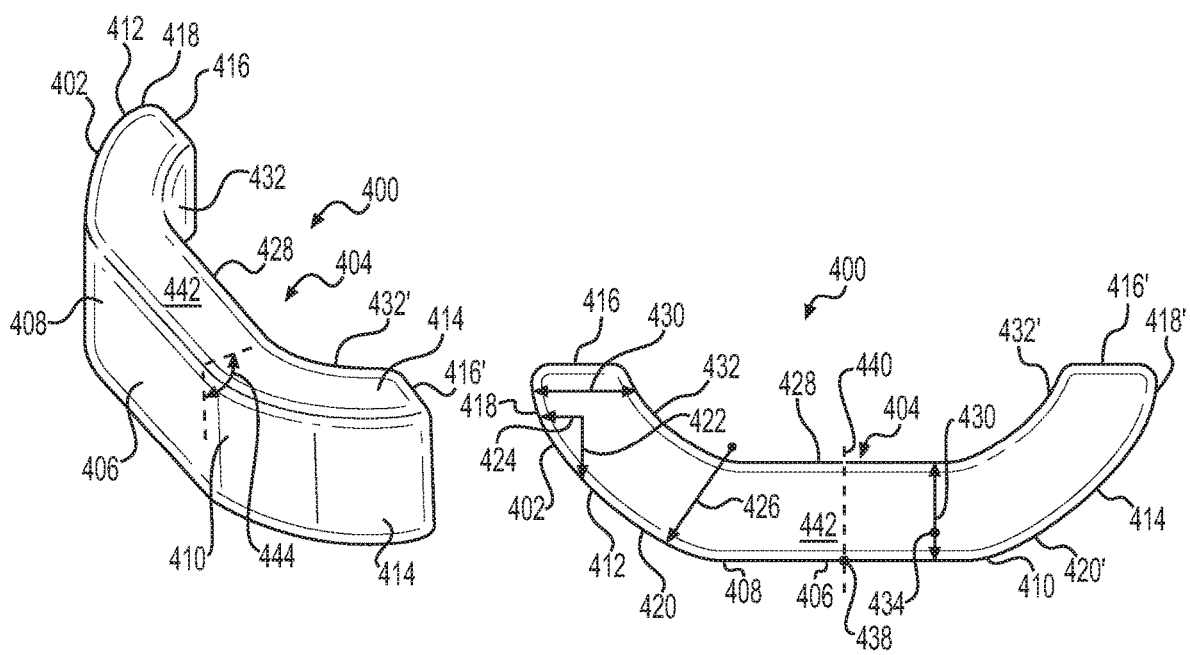
FIG. 13
FIG. 14
FIG. 15

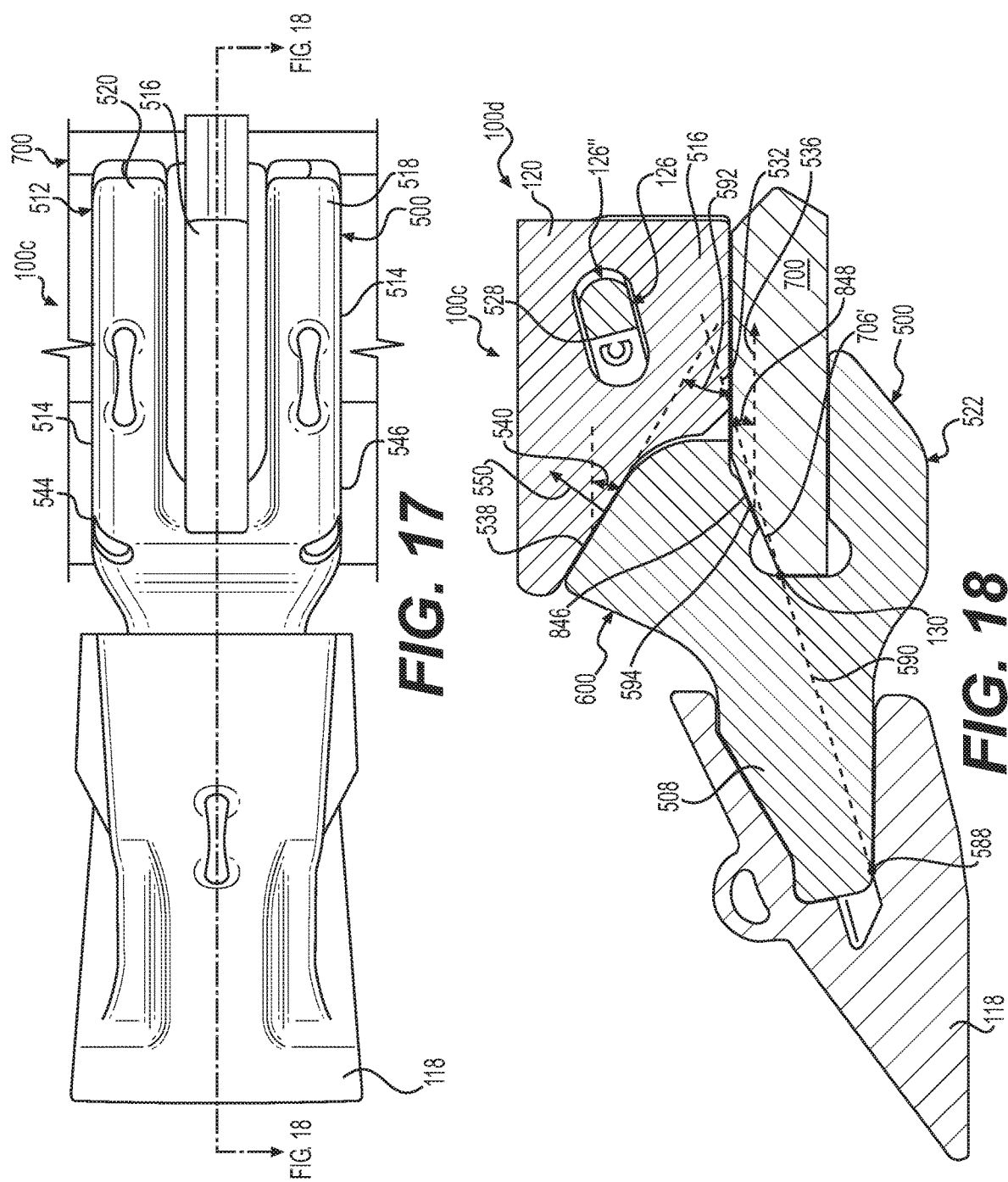

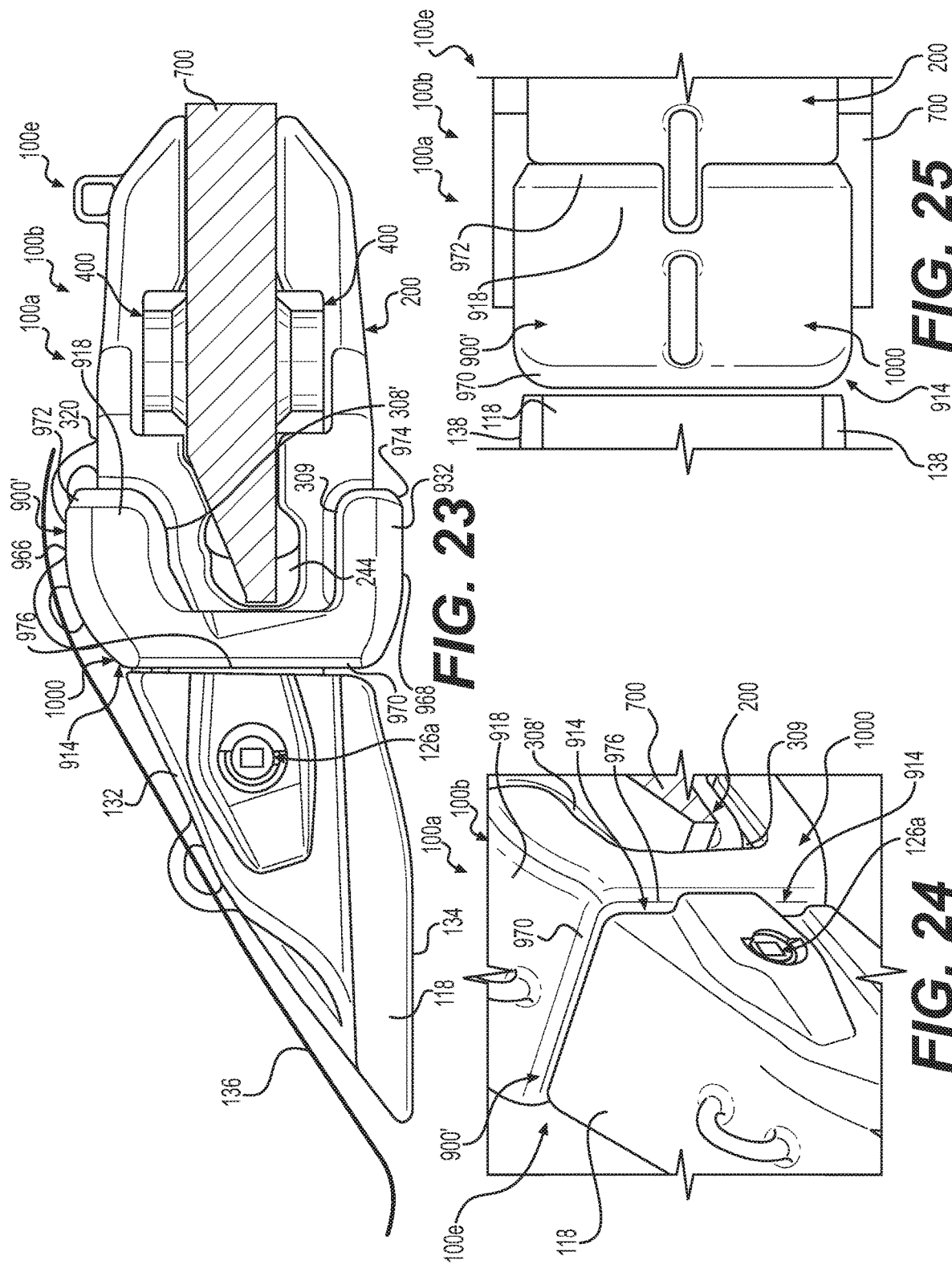

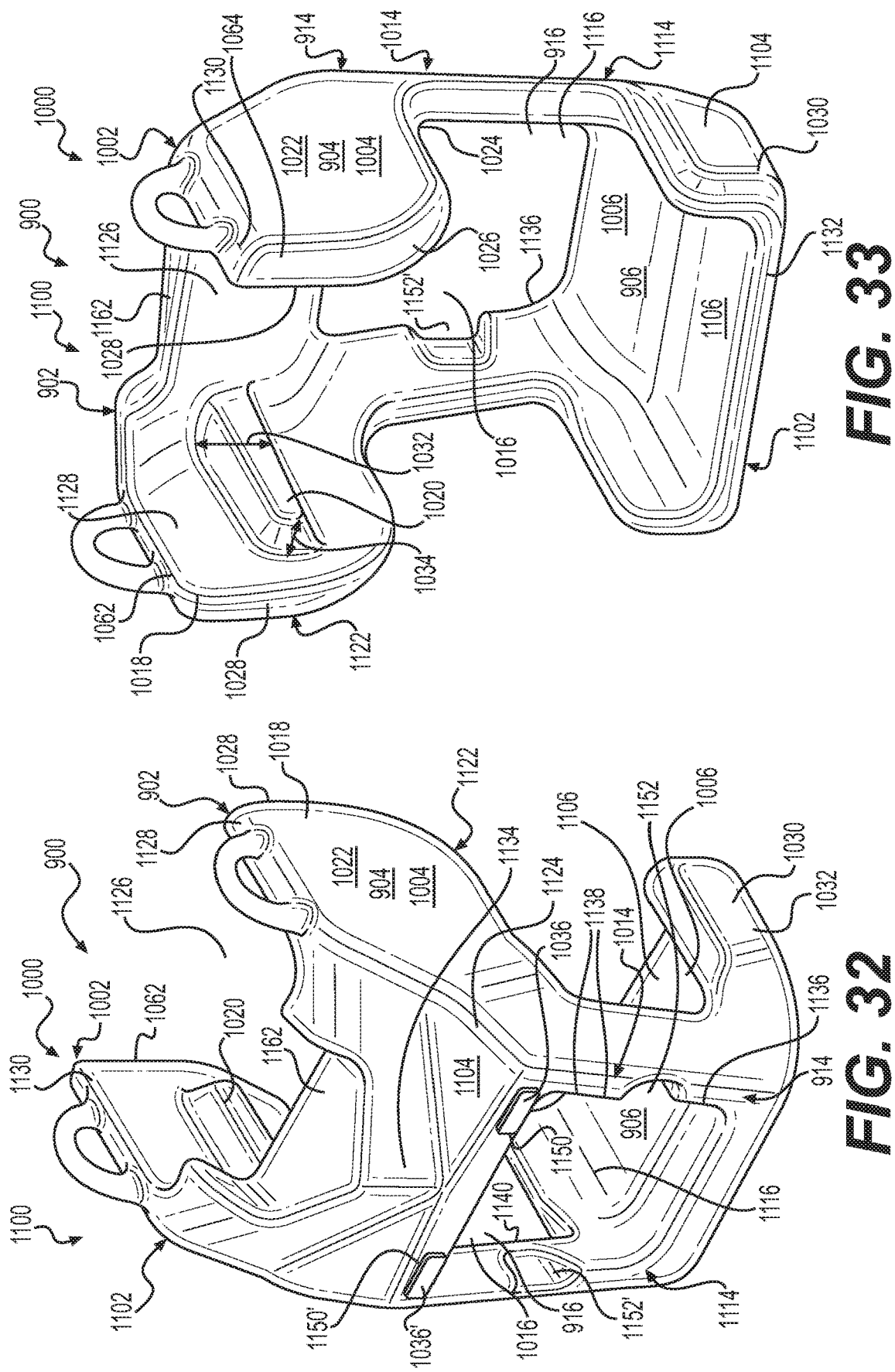

US 11,479,950 B2

WORK IMPLEMENT ASSEMBLY USING A LOAD SHARING BLOCK WITH AN ARCUATE PROFILE

CROSS-REFERENCE TO RELATED APPLICATION

This non-provisional patent application claims the benefit of U.S. Provisional Patent Application No. 62/768,403, filed on Nov. 16, 2018, entitled "Advansys Mechanically Attached Adaptor", the contents of which is hereby incorporated by reference in its entirety.

TECHNICAL FIELD

The present disclosure relates to work implement assemblies such as bucket assemblies used by earth moving, mining, construction equipment and the like. More specifically, the present disclosure relates to such assemblies that employ a notched base edge and tool adapters mating with the base edge.

BACKGROUND

Machines such as wheel loaders, excavators, and the like employ work implement assemblies including bucket assemblies, rakes, shears, etc. that have teeth or tips attached to them to help perform work on a material such as dirt, rock, sand, etc. For example, teeth or tips may be attached to a bucket assembly to help the bucket assembly to penetrate the ground, facilitating the scooping of the dirt into a bucket. Adapters are often attached to the work edges (e.g. the base edge, the side edge, etc.) of the bucket or other work implement so that different styles of teeth or tips may be attached to the work implement. Also, the tips or teeth may be replaced easily when worn by providing an adapter that is attached to the work implement.

Many such adapters are mechanically attached to the working edge of the work implement. However, current adapters do not always meet customer requirements for longevity or durability.

U.S. Pat. No. 10,119,252 discloses a tool adapter for attaching a tool to a work implement using a retaining mechanism that includes a body that defines a pocket that defines an abutment or reinforcement surface. The body may include a nose portion that is configured to facilitate the attachment of a tool or tip, a first leg, a second leg, and a throat portion that connects the legs and nose portion together. At least one leg may define an aperture that is configured to receive a retaining mechanism. The first and second legs and the throat portion also define a slot that includes a closed end and an open end that defines a direction of assembly onto a work implement. The minimum distance measured from the abutment surface to the throat measured in the direction of assembly is less than the minimum distance from the aperture to the throat measured in the direction of assembly. The base edge is straight and a reinforcement member may contact the side of a leg.

SUMMARY OF THE DISCLOSURE

A load sharing block according to an embodiment of the present disclosure comprises a body including a flat outer surface defining a first end and a second end, a first arcuate outer portion extending from the first end of the flat outer surface, and a second arcuate outer portion extending from the second end of the flat outer surface. The first arcuate outer portion terminates at a first free end and includes a first elliptical outer surface extending from the first free end.

A load sharing block according to an embodiment of the present disclosure comprises a body including a flat outer surface defining a first end and a second end, a first arcuate outer portion extending from the first end of the flat outer surface, and a second arcuate outer portion extending from the second end of the flat outer surface, a flat inner surface offset inwardly a predetermined thickness from the flat outer surface, and a first arcuate inner portion offset inwardly the same predetermined thickness from the first arcuate outer portion. The first arcuate outer portion terminates at a first free end and includes a first elliptical outer surface extending from the first free end toward the flat outer surface and the second arcuate outer portion terminates at a second free end and includes a second elliptical outer surface extending from the second free end toward the flat outer surface.

A work implement assembly according to an embodiment of the present disclosure comprises a base edge, a center adapter configured to be attached to the base edge, the center adapter including a body that includes a nose portion that is configured to facilitate the attachment of a tool, a first leg that includes a pair of first leg opposing side surfaces, a second leg that includes a pair of second leg opposing side surfaces, a throat portion that connects the legs and nose portion together, and at least one of the first leg and the second leg defines an aperture that is configured to receive a mounting mechanism. The body defines a first top pocket that defines a first top pocket arcuate abutment surface disposed adjacent one of the pair of first leg opposing side surfaces, and the first and the second legs and the throat portion define a slot that includes a closed end and an open end, the slot defining a direction of assembly onto a work implement, a lateral direction that is perpendicular to the direction of assembly, and a vertical direction that is perpendicular to the lateral direction and the direction of assembly. A first load sharing block may also be provided that includes a first arcuate reinforcement surface engaging the first top pocket arcuate abutment surface.

BRIEF DESCRIPTION OF THE DRAWINGS

FIG. 13 is a front oriented perspective view of the load sharing block of FIG. 12.

FIG. 14 is a rear oriented perspective view of the load sharing block of FIG. 12.

FIG. 15 is a top view of the load sharing block of FIG. 12.

FIG. 17 is a top view of an instance of a corner adapter, the notched base edge, the horizontal mounting mechanism and the corner tip of FIG. 1 with the corner adapter cover removed for enhanced clarity.

FIG. 18 is a side sectional view of the corner adapter, the notched base edge, the horizontal mounting mechanism and corner tip of FIG. 17.

FIG. 23 is a side view of an instance of the center adapter, center tip, notched base edge and center adapter cover of FIG. 1, illustrating the flow of material over the center adapter cover, helping to protect the top leg of the center adapter from wear.

FIG. 24 is an enlarged perspective view of the center adapter, the center tip, the center adapter cover, and the notched base edge of FIG. 23.

FIG. 25 is a top view of the center adapter, the center tip, the center adapter cover, and the notched base edge of FIG. 24.

FIG. 32 is a front oriented perspective view of the corner adapter cover of FIG. 29.

FIG. 33 is a rear oriented perspective view of the corner adapter cover of FIG. 29.

DETAILED DESCRIPTION

Figure 1:
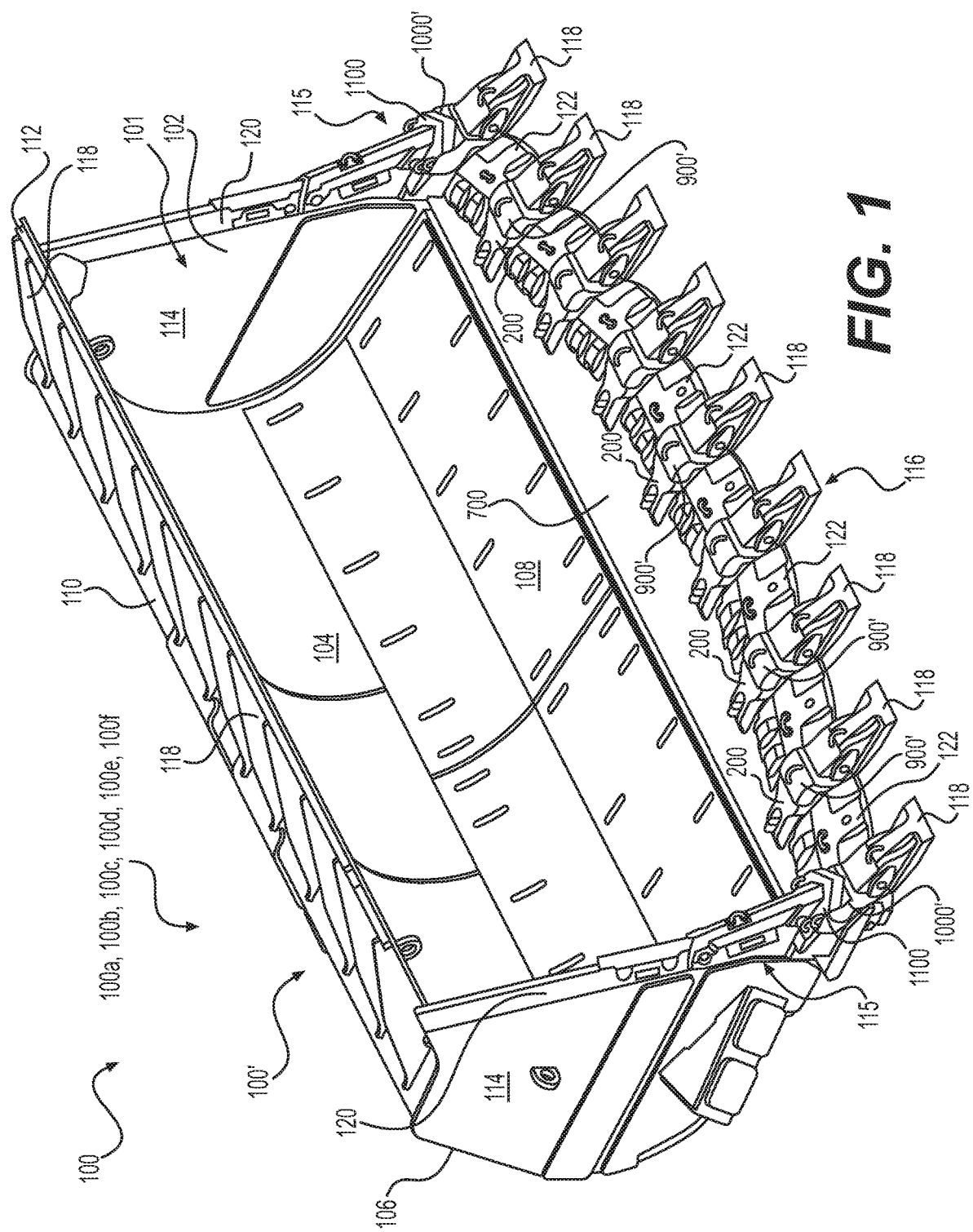
FIG. 1 is a perspective view of a work implement assembly such as a bucket assembly using components such as a center adapter, a corner adapter, a load sharing block, a center adapter cover, a corner adapter cover, a center tip, a corner tip, and a notched base edge configured according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

A work implement assembly using center adapters, corner adapters, load sharing blocks, center adapter covers, corner adapter covers, and base edges according to various embodiments of the present disclosure will now be discussed.

Starting with FIG. 1, the work implement assembly 100, 100a, 100b, 100c, 100d, 100e, 100f may take the form of a bucket assembly 100' that includes an enclosure 101 that defines an opening 102 that communicates with a generally enclosed interior. Starting from the rear of the bucket assembly 100 as shown in FIG. 1, the bucket assembly 100 includes a curved shell profile 104, which is attached to a rear wall 106 at the top end of the shell 104. The other end of the shell is attached to the bottom plate 108 of the assembly 100. A top plate 110 is attached to the top end of the rear wall 106. The top plate 110 transitions to a spill guard 112 that is designed to funnel material into the interior of the bucket and prevent material from spilling out of the bucket. Reinforcing ribs 118 are provided that are attached to the top plate 110 and the spill guard 112, providing reinforcement for strength. Two substantially flat end plates 114 are attached to the side edges of the spill guard 112, top plate 110, rear wall 106, bottom plate 108 and shell 104.

A side edge assembly 115 is attached to each end plate 114 while a front edge assembly 116 is attached to the front edge of the bottom plate 108 of the bucket assembly 100. The front edge assembly 116 includes a base edge 700, a plurality of center adapters 200 attached to the base edge 700, a plurality of tools 118 with each one of the plurality of tools 118 being attached to one of the plurality of center adapters 200, and a plurality of center adapter covers 900' with a single one of the plurality of center adapter covers 900' being interposed between one of the plurality of center adapters 200 and one of the plurality of tools 118. Also, two corner adapters 1100 are also attached to the base edge 700 and the side edges 120 of the bucket assembly 100'. A single corner adapter cover 1000' is interposed between each one of the corner adapters 1100 and a tool 118. A plurality of base edge protectors 122 are also provided with each one of the base edge protectors 122 positioned between center adapters 200 and between a center adapter 200 and a corner adapter 1100. A side edge protector 124 is also provided that is attached to the side edge 120 proximate to a corner adapter 1100 and a corner adapter cover 1000'.

It is to be understood the work implement assembly may take other forms other than a bucket assembly including rake assemblies, shear assemblies, etc. Also, any of the embodiments of the adapters, center adapters, corner adapters, adapter covers, corner adapter covers, center adapter covers, load sharing blocks, and base edges as will be described hereinafter in more detail may be used in any suitable work implement assembly including those depicted in FIG. 1.

Referring now to FIGS. 2 thru 12, a center adapter 200 that may be used for attaching a tool 118 to a work implement assembly 100a (see FIG. 10) using a mounting mechanism 126 (see FIG. 11) will now be discussed in more detail. The center adapter 200 comprises a body 202 that may include a nose portion 204 that is configured to facilitate the attachment of a tool 118. The body 202 may further include a first leg 206 that includes a first leg side surface 208, a second leg 210 that includes a second leg side surface 212, and a throat portion 214 that connects the legs 206, 210 and nose portion 204 together. At least one of the first leg 206 and the second leg 210 defines an aperture 215 that is configured to receive a mounting mechanism 126 (see FIG. 11).

As best seen in FIGS. 2, 6, 7, 10 and 12, the body 202 may define a pocket 216 that defines an abutment surface 218. The pocket 216 may be located on the first leg side surface 208 or the second leg side surface 212 and the pocket 216 may define a pocket height H216, a pocket width W216 (see FIG. 2), and a pocket depth D216 (see FIG. 11).

Looking at FIGS. 2, 6, 7 and 10, the first and the second legs 206, 208 and the throat portion 214 define a slot 220 that includes a closed end 222 and an open end 224. The slot 220 may define a direction of assembly 226 onto a work implement assembly 100a. The first leg 206 may include a sloped portion 228 disposed adjacent the closed end 222 along the direction of assembly 226. The sloped portion 228 may form a first oblique angle 230 with the direction of assembly 226, partially defining the slot 220 (see FIG. 5). The sloped portion 228 defines a sloped portion surface normal 231 facing downwardly and along the direction of assembly 226. The first oblique angle 230 may range from 20 degrees to 40 degrees. Thus, the slot 220 may be configured to accommodate a chamfered or beveled base edge. Other configurations of the slot are possible in other embodiments including those forming different angles or those configured to accommodate squared-off base edges, etc.

Figure 7:
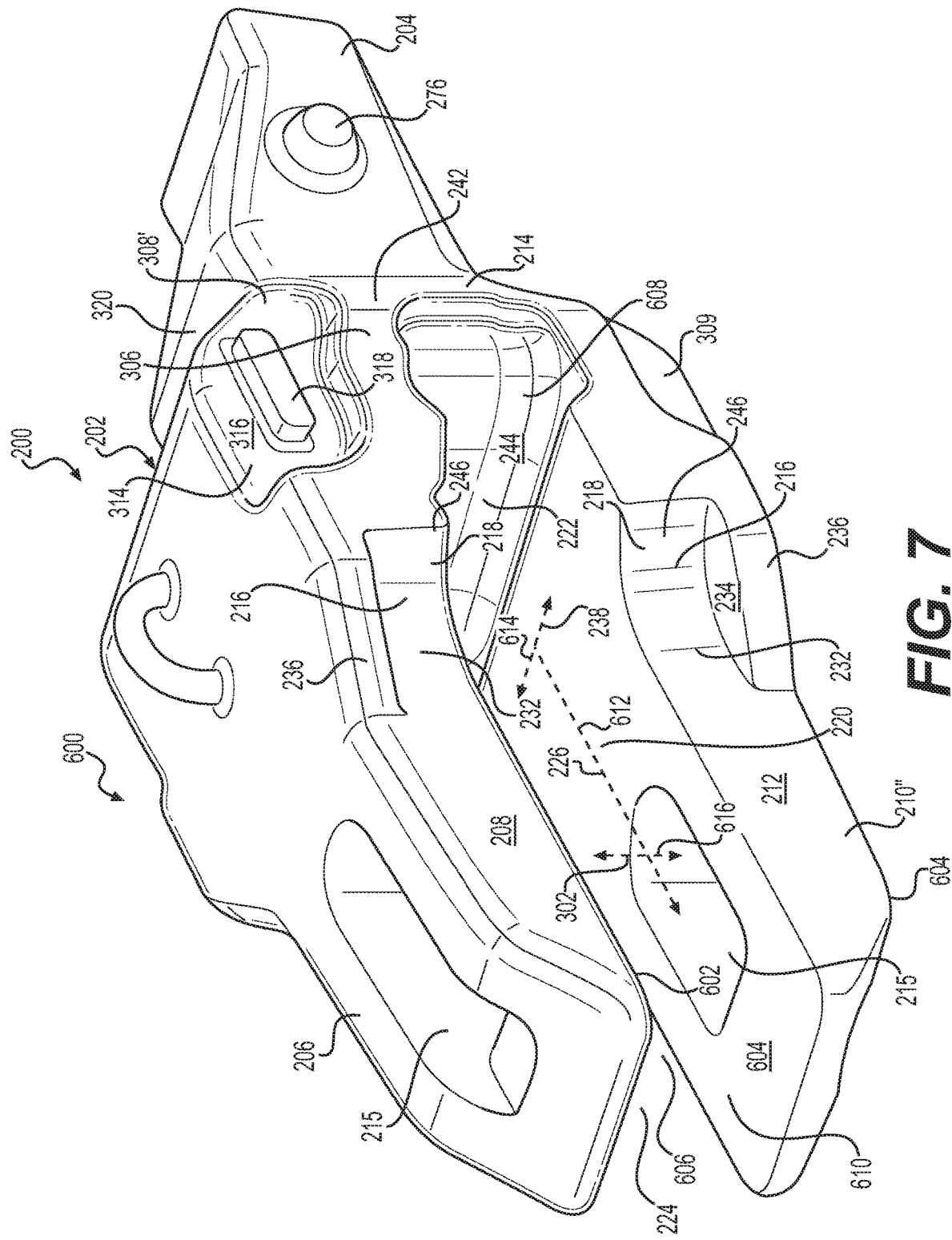
FIG. 7 is a rear oriented perspective view of the center adapter of FIG. 6.

Looking at FIG. 7, the pocket 216 may be configured with an opening facing 232 toward the direction of assembly 226. The pocket 216 may include a bottom pocket surface 234 that faces in a direction 235 not parallel to the direction of assembly 226 (e.g. substantially perpendicular). Hence, an overhanging ledge 236 is provided that may protect a load sharing block 400 from wear as material passes over the center adapter 200. Other configurations are possible in other embodiments.

Figure 11:
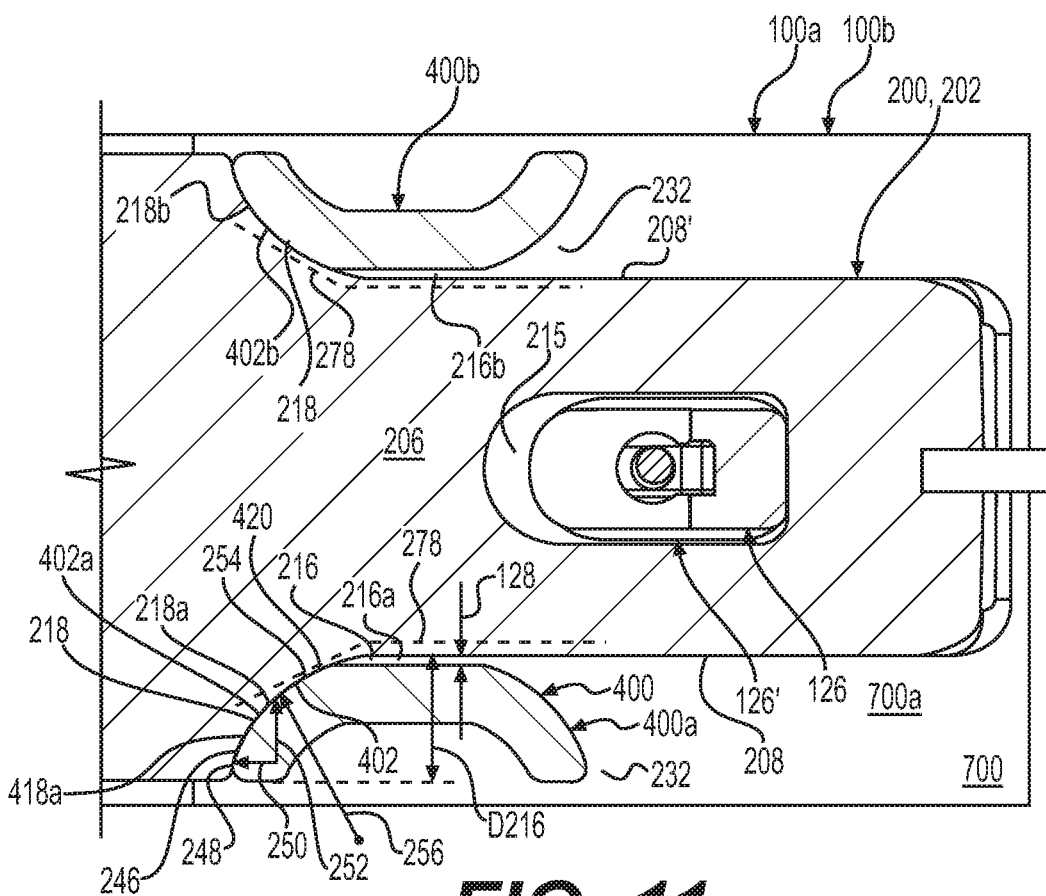
FIG. 11 is a top sectional view of FIG. 10 showing the top leg of the center adapter, a vertical mounting mechanism, the notched base edge and the top load sharing blocks of FIG. 10.
Figure 12:
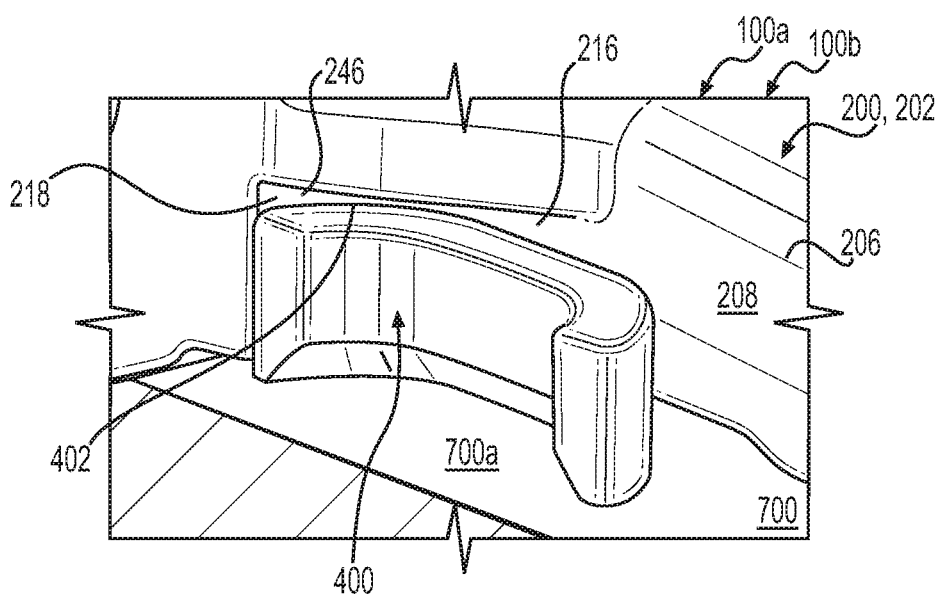
FIG. 12 is an enlarged perspective view of FIG. 10 depicting a top load sharing block resting on the base edge and supporting the center adapter.

In FIGS. 7, 11, and 12, it can be seen that the abutment surface 218 is configured to mate with a load sharing block 400 and may take the form of an arcuate surface 246. Focusing on FIG. 11, the arcuate surface 246 may include an elliptical surface 248 defining a minor axis 250 ranging from 60 mm to 100 mm and a major axis 252 ranging from 100 mm to 130 mm. The major axis may be aligned with the direction of assembly. In some embodiments, the arcuate surface 246 is divided into a plurality of differently configured surfaces. For example, the arcuate surface 246 may also include a radial surface 254 defining a radius of curvature 256 ranging from 50 mm to 200 mm. The radial surface 246 may be disposed between the first leg side surface 208 and the elliptical surface 248. The interface with the load sharing block 400 may create a wedge effect (represented by dotted lines in FIG. 11) as the center adapter 200 is pushed toward the base edge 700. Other configurations are possible in other embodiments.

Referring now to FIGS. 2, 3, 6, 7 and 10, the slot 220 may also define a lateral direction 238 that is perpendicular to the direction of assembly 226. The throat portion 214 may further comprise a first throat side surface 240 disposed along the lateral direction 230 and a second throat side surface 242 disposed on the opposite side of the throat portion 214 along the lateral direction 238. The throat portion 214 may further comprise a protrusion 244 disposed at the closed end 222 of the slot 220. The protrusion 244 may extend along the direction of assembly 226 and along the lateral direction 238 proximate to the first throat side surface 240 and proximate to the second throat side surface 242.

Figure 3:
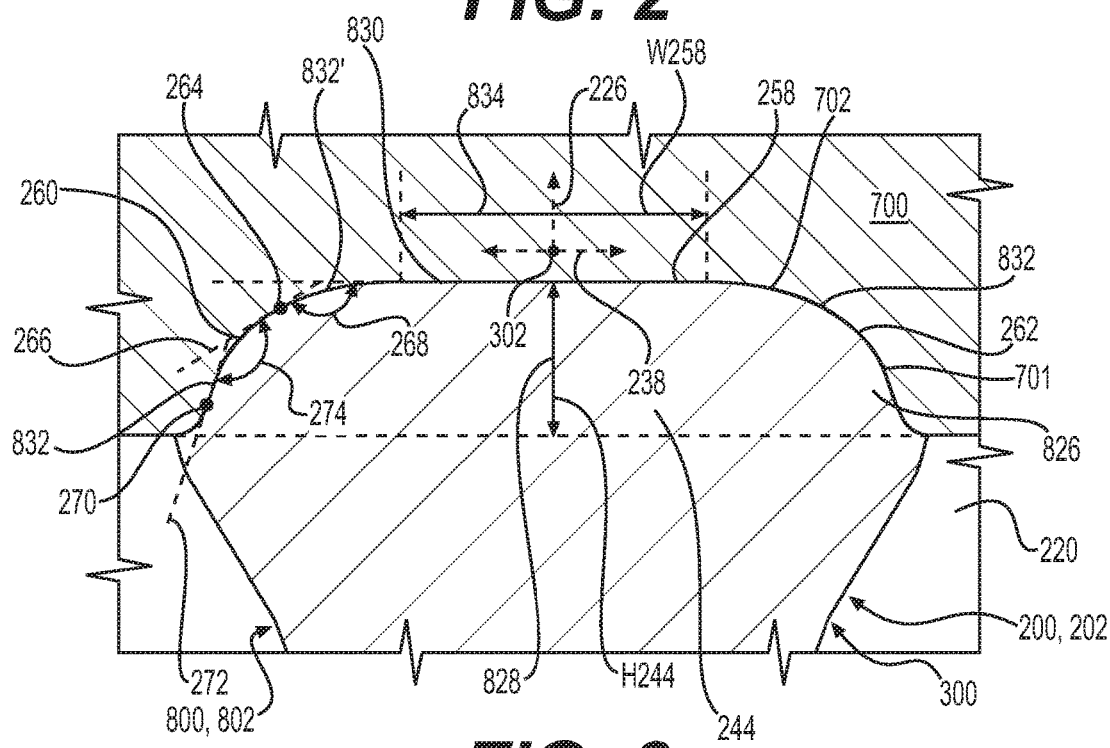
FIG. 3 is a top sectional view of the center adapter and notched base edge of FIG. 2 illustrating how the center adapter mates with a center notch of the notched base edge.

Focusing on FIG. 3, the protrusion 244 may define a protrusion height H244 along the direction of assembly 226 and may also include a flat middle portion 258 straddled laterally by a first arcuate portion 260 and a second arcuate portion 262. The flat middle portion 258 may define a lateral width W258. The protrusion height H244 may range from 0.1 multiplied by the lateral width W258 to 0.5 multiplied by the lateral width W258. The protrusion 244 may be complimentarily configured as the corresponding center notch 702 of the base edge 700 (e.g. designed line to line). Other configurations are possible.

The first arcuate portion 260 may define a midpoint 264 and a midpoint tangent 266 that forms a first obtuse angle 268 with the flat middle portion 258 ranging from 100 degrees to 160 degrees (e.g. approximately 130 degrees). The first arcuate portion 260 may also define an end point 270 and an end point tangent 272 that forms a second obtuse angle 274 with the midpoint tangent 266 ranging from 100 degrees to 160 degrees (e.g. approximately 130 degrees). Again, other configurations are possible. The sloped portion and the protrusion may be configured in order to help to maximize the contact area with the base edge, helping to provide stability for the adapter.

Now, an adapter 300 according to another embodiment of the present disclosure will be described that may take the form of a center adapter, such as shown in FIGS. 2 thru 12, or a corner adapter, etc. With reference to FIGS. 2, 6, 7, and 8, the adapter 300 may comprise a body 202 that includes a nose portion 204 that is configured to facilitate the attachment of a tool 118, a first leg 206 that includes a first leg side surface 208, a second leg 210 that includes a second leg side surface 212, a throat portion 214 that connects the legs 206, 210 and nose portion 204 together. At least one of the first leg 206 and the second leg 210 may define an aperture 215 that is configured to receive a mounting mechanism 126.

The body 202 may also define a pocket 216 that defines an abutment surface 218. The pocket 216 may be located on a side surface 208, 212 of at least one of the first leg 206 and the second leg 210. The pocket 216 may be configured in a manner as previously described herein.

The first and the second legs 206, 210 and the throat portion 214 may define a slot 220 that includes a closed end 222 and an open end 224. The slot 220 may define a direction of assembly 226 onto a work implement assembly 100a, a lateral direction 238 that is perpendicular to the direction of assembly 226, and a vertical direction 302 that is perpendicular to the direction of assembly 226 and the lateral direction 238. The throat portion 214 may further comprise a first throat side surface 304 disposed along the lateral direction 238 and a second throat side surface 306 disposed on the opposite side of the throat portion 214 along the lateral direction 238. The first throat side surface 304 may define a first adapter cover receiving recess 308 including a first vertical surface 310. A first key 312 may extend laterally from the first vertical surface 310. The first key 312 may provide stability and support to an adapter cover that is inserted onto the adapter.

Similarly, the second throat side surface 306 may define a second adapter cover receiving recess 314 including a second vertical surface 316. A second key 318 may extend laterally from the second vertical surface 318.

The body 202 includes a top surface 320 that may extend from the nose portion 204 over the throat portion 214 to the first leg 206. The throat portion 214 may further include a first sidewall 322 extending from the first throat side surface 304, partially defining the first adapter cover receiving recess 308. The first key 312 may be spaced away from the first sidewall 322 and may also be spaced away from the top surface 320.

Figure 6:
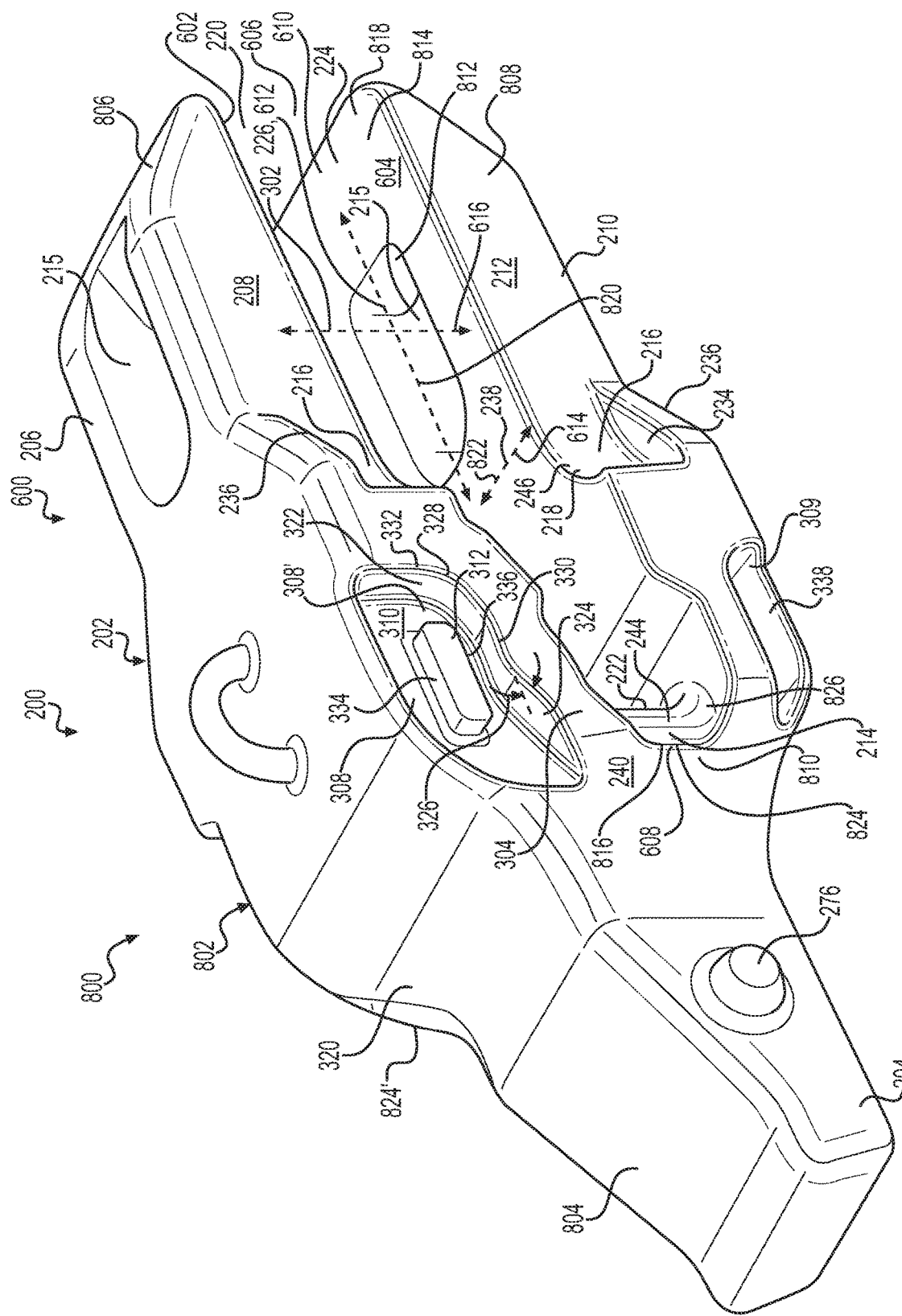
FIG. 6 is a front oriented perspective view of the center adapter of FIG. 2 removed from notched base edge.

Looking at FIG. 6, the first sidewall 322 may include a front lead-in portion 324 disposed proximate the nose portion 204 along the direction of assembly 226. The front lead-in portion 324 may form a lead-in acute angle 326 with the direction of assembly 226 ranging from 15 degrees to 30 degrees. Also, the first sidewall 322 further comprises a rear abutment portion 328 disposed along the direction of assembly 226 and a transitional portion 330 connecting the rear abutment portion 328 to the front lead-in portion 324. The rear abutment portion 328 including a rear abutment vertical surface 332. The transitional portion 330 may include a serpentine shape. Other configurations for these various features are possible in other embodiments.

The first key 312 may include a first key top surface 334 and a first key bottom surface 336. The first key top surface 334 and the first key bottom surface 336 may be tapered along the direction of assembly 226, being configured to facilitate the attachment of an adapter cover to the adapter 200 (e.g. a center adapter cover 900). The throat portion 214 further includes a first bottom clearance notch 338 disposed vertically opposite the first adapter cover receiving recess 308 below the slot 220. The first bottom clearance notch 338 may also be configured to facilitate the attachment of an adapter cover to the adapter 200 (e.g. a center adapter cover 900).

Next, a work implement assembly 100a will be discussed in reference to FIGS. 1 thru 5. The work implement assembly 100a may comprise a notched base edge 700a defining a center notch 702, and a center adapter 200 configured to be attached to the notched base edge 700a. The center adapter 200 has a body 202 that includes a nose portion 204 that is configured to facilitate the attachment of a tool 118 using a mounting mechanism 126a such as sold under the TRADENAME of CAPSURE sold by the assignee of the present application. The mounting mechanism 126a may be used to attach the tool 118 to a lug 276 located on the nose portion 204.

The body 202 may also have a first leg 206 that includes a first leg side surface, a second leg 210 that includes a second leg side surface 212, a throat portion 214 that connects the legs 206, 210 and nose portion 204 together. At least one of the first leg 206 and the second leg 210 defines an aperture 215 that is configured to receive a mounting mechanism 126.

The first and the second legs 206, 210 and the throat portion 214 define a slot 220 that includes a closed end 222 and an open end 224. The slot 220 may also define a direction of assembly 226 onto the work implement assembly 100a and a lateral direction 238 that is perpendicular to the direction of assembly 226. The throat portion 214 further comprises a first throat side surface 240 disposed along the lateral direction 238 and a second throat side surface 242 disposed on the opposite side of the throat portion 214 along the lateral direction 238. The throat portion 214 further comprises a protrusion 244 disposed at the closed end 222 of the slot 220. The protrusion 244 may extend along the direction of assembly 226 and along the lateral direction 238 proximate to the first throat side surface 240 and proximate to the second throat side surface 242.

Focusing on FIG. 3, the protrusion 244 may define a protrusion height H244 along the direction of assembly 226. The protrusion 244 may have a flat middle portion 258 straddled laterally by a first arcuate portion 260 and a second arcuate portion 262. The flat middle portion 258 may also define a lateral width W258. The protrusion height H244 may range from 0.1 multiplied by the lateral width W258 to 0.5 multiplied by the lateral width W258.

The first arcuate portion 260 defines a midpoint 264 and a midpoint tangent 266 that forms a first obtuse angle 268 with the flat middle portion 258 ranging from 100 degrees to 160 degrees (e.g. approximately 130 degrees). Likewise, the first arcuate portion 260 may also define an end point 270 and an end point tangent 272 that forms a second obtuse angle 274 with the midpoint tangent 266 ranging from 100 degrees to 160 degrees (e.g. approximately 130 degrees). The center notch 702 of the notched base edge 700a is complimentarily configured to the protrusion 244, making contact with the protrusion 244 (e.g. designed line to line).

Figure 5:
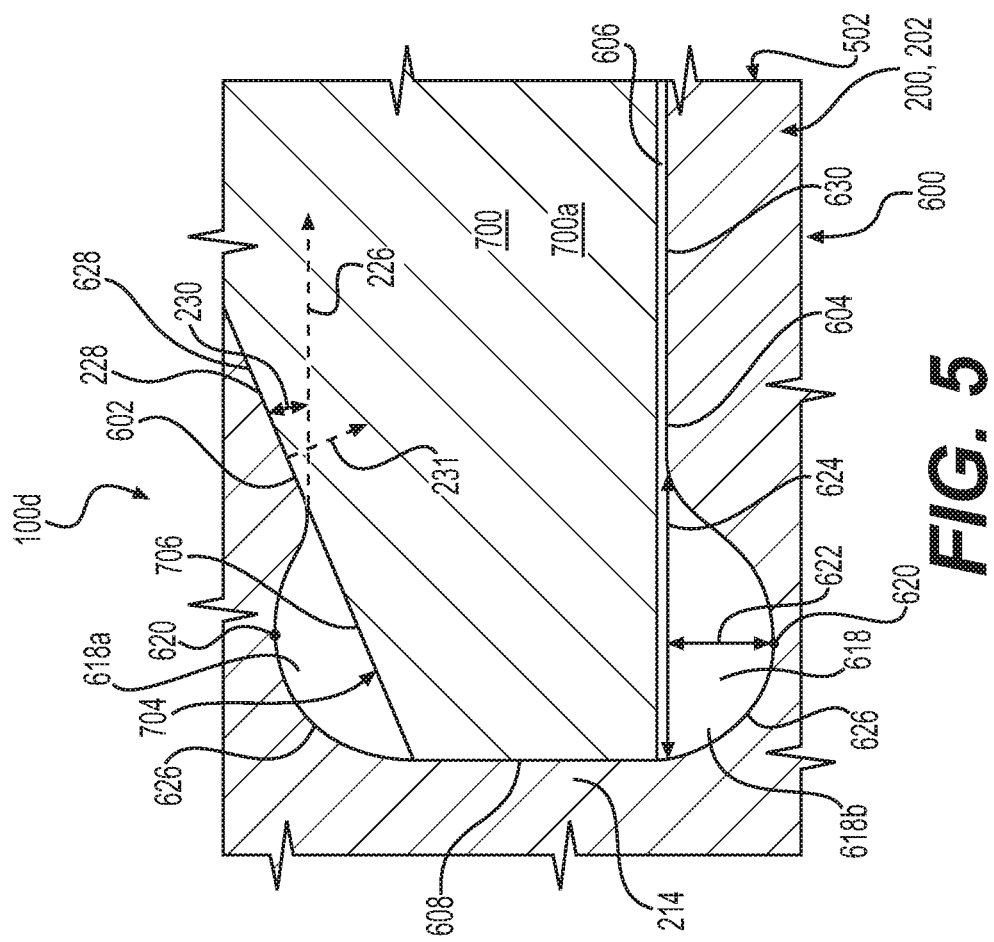
FIG. 5 is an enlarged side view of the center adapter and notched base edge of FIG. 2 illustrating the clearance provided between the front portion of the notched base edge and the base edge receiving slot of the center adapter.
Figure 4:
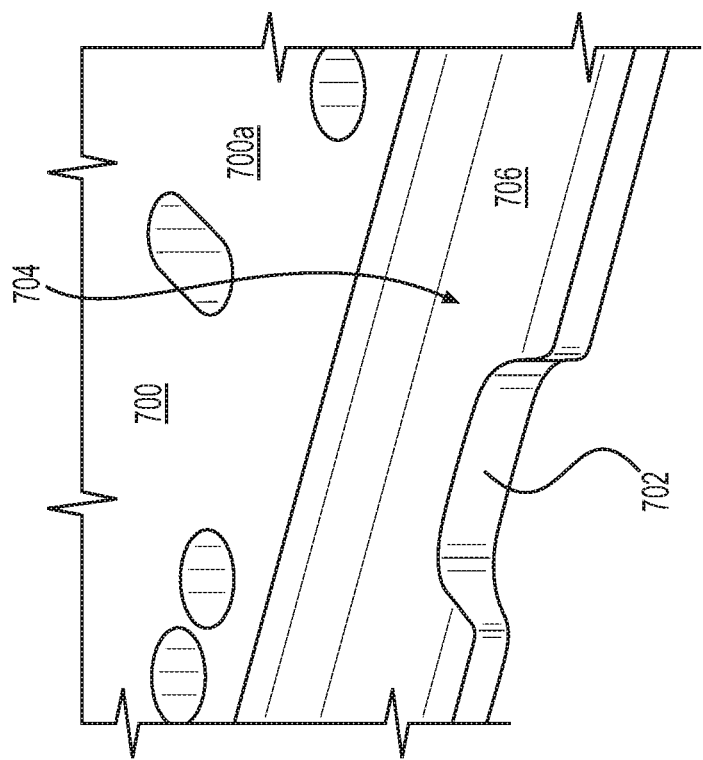
FIG. 4 is an enlarged perspective view of the notched base edge of FIG. 3 with the center adapter removed to show the center notch of the notched base edge with more clarity.

Looking at FIGS. 4 and 5, the notched base edge 700a may include a front portion 704 including a top beveled surface 706. The first leg 206 includes a sloped portion 228 disposed adjacent the closed end 222 along the direction of assembly 226. The sloped portion 228 may form a first oblique angle 230 with the direction of assembly 226, partially defining the slot 220. The first oblique angle 230 may range from 20 degrees to 40 degrees. The sloped portion 228 may contact the top beveled surface 706. The interface between the adapter and the base edge may provide the maximum amount of contact area to reduce adapter stress in up and down loads and the arcuate portions may reduce the stress in the base edge. The components may be "pre-seated" or designed line-to-line, which may aid in providing adapter support in loading by helping to distribute the load.

As shown in FIGS. 11 and 12, the work implement assembly 100a may also have a load sharing block 400 that is attached to the notched base edge 700a that has an arcuate reinforcement surface 402. The work implement assembly 100a may also have a vertical mounting mechanism 126' disposed in the aperture 215 of the at least one of the first leg 206 and the second leg 210.

The body 202 of the center adapter 200 defines a pocket 216 disposed on the first leg side surface 208 that defines an abutment surface 218 that is complimentarily configured as the arcuate reinforcement surface 202, making contact with the arcuate reinforcement surface 402 (e.g. designed line to line). The load sharing block 400 may be spaced laterally away from the first leg side surface 208 a lateral predetermined distance 128.

Various embodiments of a load sharing block 400, mentioned earlier herein, and their associated features will now be discussed in further detail with reference to FIGS. 13 thru 15. The load sharing block 400 may comprise a body 404 including a flat outer surface 406 defining a first end 408 and a second end 410. A first arcuate outer portion 412 extending from the first end 408 of the flat outer surface 406, and a second arcuate outer portion 414 extending from the second end 410 of the flat outer surface 406. The first arcuate outer portion 412 terminates at a first free end 416 and includes a first elliptical outer surface 418 extending from the first free end 416.

Moreover, as best seen in FIG. 15, the first arcuate outer portion 412 may further includes a first radial surface 420 disposed between the first elliptical outer surface 418 and the flat outer surface 406. The first elliptical outer surface 418 may define a minor axis 422 ranging from 30 mm to 60 mm and a major axis 424 ranging from 70 mm to 100 mm. The first radial surface 420 may define a radius of curvature 426 ranging from 50 mm to 100 mm.

The body 404 may further include a flat inner surface 428 offset inwardly a predetermined thickness 430 from the flat outer surface 406. In like fashion, a first arcuate inner portion 432 may be offset inwardly the same predetermined thickness 430 from the first arcuate outer portion 412.

The body 404 may also define a vertical direction 434 (see also FIG. 13) perpendicular to the predetermined thickness 430 and a height 436 measured along the vertical direction 434. The height 436 may range from 1.5 multiplied by the predetermined thickness 430 to 3.0 multiplied by the predetermined thickness 430.

Furthermore, the body 404 may define a midpoint 438 of the flat outer surface 406 and a plane of symmetry 440 passing through the midpoint 438. The body 404 may also include a top surface 442 disposed along the vertical direction 434 that forms a right angle 444 with the flat outer surface 406 and the first elliptical outer surface 418. The body 404 may further include a bottom surface 446 and a beveled surface 448 leading from the bottom surface 446 to the first arcuate inner portion 432 and the flat inner surface 428. The beveled surface 448 may form an obtuse bevel angle 450 with the bottom surface 446 at the first free end 416 ranging from 30 degrees to 60 degrees.

The beveled feature may allow a bead of weld to be used to attach the load sharing block to the base edge while the symmetry of the load sharing block may allow it to be used on opposite sides of an adapter. The configurations of these various features of the load sharing block may be altered to be different or may be omitted in other embodiments of the present disclosure.

Another embodiment of a load sharing block 400 will now be discussed with continued reference to FIGS. 13 thru 15. Such a load sharing block 400 may comprise a body 404 that includes a flat outer surface 406 defining a first end 408 and a second end 410, a first arcuate outer portion 412 extending from the first end 408 of the flat outer surface 406, and a second arcuate outer portion 414 extending from the second end 410 of the flat outer surface 406.

Focusing on FIG. 15, a flat inner surface 428 may be offset inwardly a predetermined thickness 430 from the flat outer surface 406. A first arcuate inner portion 432 may be offset inwardly the same predetermined thickness 430 from the first arcuate outer portion 412. Also, a second arcuate inner portion 432' may be offset inwardly the same predetermined thickness 430 from the second arcuate outer portion 414.

The first arcuate outer portion 412 may terminate at a first free end 416 and may include a first elliptical outer surface 418 extending from the first free end 416 toward the flat outer surface 406. The second arcuate outer portion 414 may also terminate at a second free end 416' and may include a second elliptical outer surface 418' extending from the second free end 416' toward the flat outer surface 406.

The first arcuate outer portion 412 may further include a first radial surface 420 disposed between the first elliptical outer surface 418 and the flat outer surface 406. The second arcuate outer portion 414 may further include a second radial surface 420' disposed between the second elliptical outer surface 418' and the flat outer surface 406.

The second elliptical outer surface 418' may be symmetrically configured to the first elliptical outer surface 418, and both the first elliptical outer surface 418 and the second elliptical outer surface 418' may define a minor axis 422 ranging from 30 mm to 60 mm and a major axis 424 ranging from 70 mm to 100 mm. The second radial surface 420' may be symmetrically configured to the first radial surface 420, and both the first radial surface 420 and the second radial surface 420' may define a radius of curvature 426 ranging from 50 mm to 100 mm.

The body 404 may also define a vertical direction 434 that is perpendicular to the predetermined thickness 430 and a height 436 measured along the vertical direction 434. The height 436 may range from 1.5 multiplied by the predetermined thickness 430 to 3.0 multiplied by the predetermined thickness 430.

The body 404 may include a top surface 442 disposed along the vertical direction 434 that forms a right angle 444 with the flat outer surface 406 and the first elliptical outer surface 418. The body 404 may further include a bottom surface 446 and a beveled surface 448 leading from the bottom surface 446 to the first arcuate inner portion 432 and the flat inner surface 428.

Referring back to FIGS. 2, 6, 7, 10, and 11, a work implement assembly 100b utilizing a load sharing block 400 and a center adapter 200 according to an embodiment of the present disclosure may be characterized as follows. The work implement assembly 100b may comprise a base edge 700, and a center adapter 200 configured to be attached to the base edge 700. The center adapter 200 may include a body 202 having a nose portion 204 that is configured to facilitate the attachment of a tool 118, a first leg 206 that includes a pair of first leg opposing side surfaces 208', a second leg 210 that includes a pair of second leg opposing side surfaces 210', a throat portion 214 that connects the legs 206, 210 and nose portion 204.

At least one of the first leg 206 and the second leg 210 may define an aperture 215 that is configured to receive a mounting mechanism 126. The body 202 may define a first top pocket 216a that defines a first top pocket arcuate abutment surface 218a disposed adjacent one of the pair of first leg opposing side surfaces 208'. The first and the second legs 206, 208 and the throat portion 214 may define a slot 220 that includes a closed end 222 and an open end 224. The slot 220 defines a direction of assembly 226 onto the work implement assembly 100b, a lateral direction 238 that is perpendicular to the direction of assembly 226, and a vertical direction 302 that is perpendicular to the lateral direction 238 and the direction of assembly 226. The work implement assembly 100b may also comprise a first load sharing block 400a including a first arcuate reinforcement surface 402a engaging the first top pocket arcuate abutment surface 218a.

In like fashion, the body 202 further comprises a second top pocket 216b that defines a second top pocket arcuate abutment surface 218b disposed adjacent the other of the pair of first leg opposing side surfaces 208'. The work implement assembly 100b may also have a second load sharing block 400b that also includes a second arcuate reinforcement surface 402b engaging the second top pocket arcuate abutment surface 218b.

Looking at FIG. 11, the first and the second load sharing blocks 400a, 400b are configured to create a wedge profile 278 for the center adapter 200 to be pulled into, providing support for lateral loads as well as vertical loads. Also, the first load sharing block 400a may be spaced laterally away from the one of the pair of the first leg opposing side surfaces 408' and the second load sharing block 400b may be spaced laterally away from the other of the pair of the first leg opposing side surfaces 408'.

The work implement assembly 100b may further comprise a vertical mounting mechanism 126' disposed in the aperture 215 of the at least one of the first leg 206 and the second leg 210. The first arcuate reinforcement surface 402 may comprise an elliptical surface 418a and a radial surface 420.

The elliptical surface 418a may define a minor axis 422 ranging from 30 mm to 60 mm, and a major axis 424 ranging from 70 mm to 100 mm. The radial surface 420 may define a radius of curvature 426 ranging from 50 mm to 100 mm.

The aforementioned geometry and features of the load sharing block 400 have the following functions. An elliptical load sharing block profile may maximize the contact area and may reduce the risk of the material of the load sharing block mushrooming, which may cause interference between the load sharing block and the adapter, making installation or removal of the load sharing block more difficult. The arcuate load sharing block profile may match the profile of the adapter in some embodiments. The gap between the load sharing block and the adapter may help to limit interference when installing or removing the load sharing block away from the adapter. Any of these functions may be omitted or may be present in various embodiments of the present disclosure.

Next, a corner adapter 500 according to various embodiments of the present disclosure will be discussed with reference to FIGS. 16 thru 19, and 29 thru 31. The corner adapter 500 may be configured to allow a tool 118 to be attached to a work implement assembly 100c using a mounting mechanism 126. Looking at FIG. 16, the corner adapter 500 may comprise a body 502 that defines a vertical direction 504 and a horizontal direction 506. The body 502 may include a nose portion 508 that is configured to facilitate the attachment of a tool 118 (e.g. via lug 510 that is used with a mounting mechanism 126a such as that sold under the TRADENAME of CAPSURE by the assignee of the present invention, see FIGS. 29 and 30).

Figure 16:
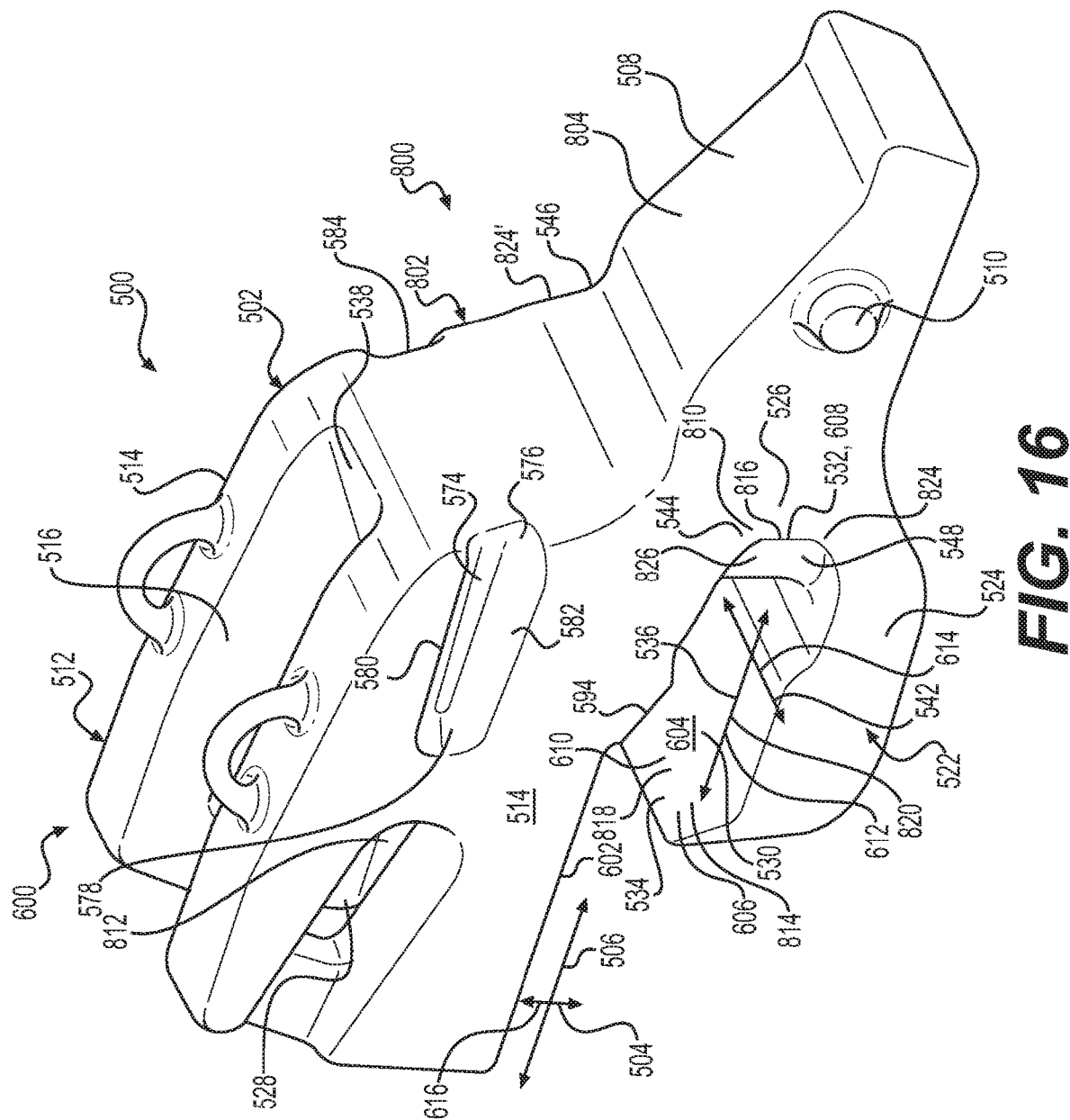
FIG. 16 is a front oriented perspective view of the corner adapter of the bucket assembly of FIG. 1 removed from the bucket assembly.

Focusing now on FIGS. 16 thru 18, the body 502 may also have a first bifurcated leg 512 that includes a pair of first leg side surfaces 514. The first bifurcated leg 512 may define a vertical slot 516 splitting the first bifurcated leg 512 into a first fork portion 518 and a second fork portion 520. The body 502 may also have a second leg 522 that includes a pair of second leg side surfaces 524, a throat portion 526 that connects the legs 512, 522 and nose portion 508 together. At least one of the first fork portion 518 and the second fork portion 520 defines an aperture 528 that is configured to receive a mounting mechanism 126 (e.g. the mounting mechanism 126 may take the form a horizontal mounting mechanism 126", see FIGS. 18, 29, and 30).

With continued reference to FIG. 16, the first and the second legs 512, 522 and the throat portion 526 define a horizontal slot 530 that includes a closed end 532 and an open end 534. The horizontal slot 530 may define a direction of assembly 536 onto a work implement assembly 100c. The first bifurcated leg 512 may include a first sloped portion 538 disposed in the vertical slot 516. The first sloped portion 538 may form a first acute angle 540 (see also FIG. 18) with the direction of assembly 536 ranging from 20 degrees to 40 degrees (e.g. approximately 30 degrees). The first sloped portion 538 may define a first sloped portion surface normal 550 that points upwardly and toward the direction of assembly 536.

As shown in FIG. 16, the horizontal slot 530 defines a lateral direction 542 that is perpendicular to the direction of assembly 536. The throat portion 526 further comprises a first throat side surface 544 disposed along the lateral direction 542 and a second throat side surface 546 disposed on the opposite side of the throat portion 526 along the lateral direction 542. The throat portion 526 further comprises a projection 548 disposed at the closed end 532 of the horizontal slot 530. The projection 548 extends along the direction of assembly 536 and along the lateral direction 542 proximate to the first throat side surface 544 and proximate to the second throat side surface 546.

Figure 19:
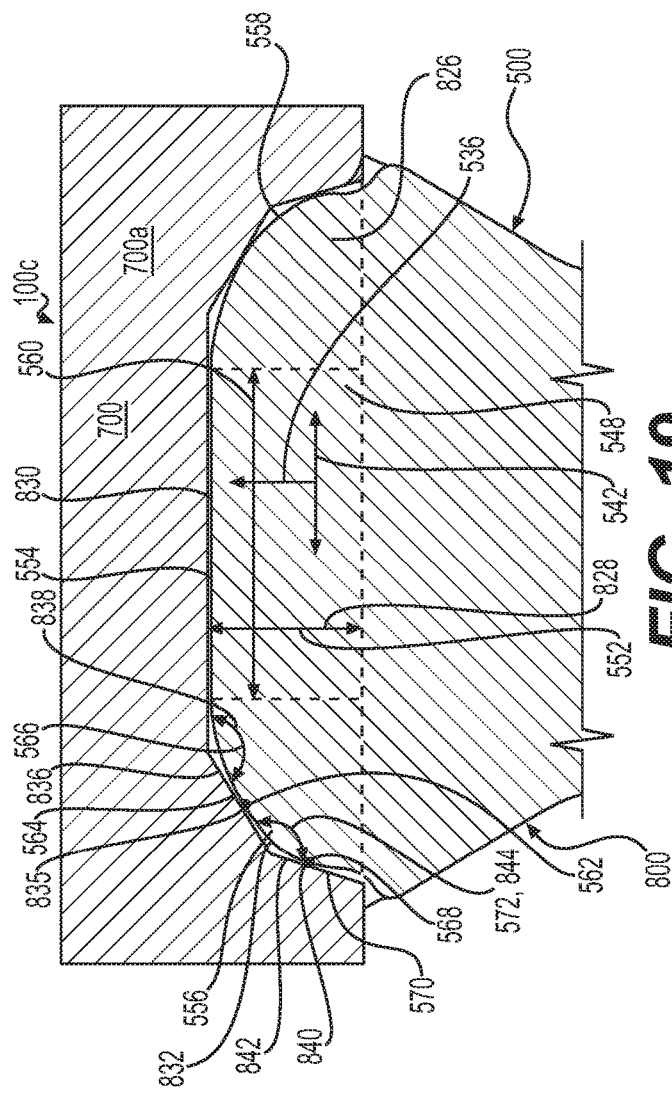
FIG. 19 is a top sectional view of the corner adapter mating with a corner notch of the notched base edge of FIG. 17.

In FIG. 19, the projection 548 may define a height 552 along the direction of assembly 536 and may have a flat middle portion 554 straddled laterally by a first arcuate portion 556 and a second arcuate portion 558. The flat middle portion 554 may define a lateral middle portion width 560, and the height 552 may range from 0.1 multiplied by the lateral middle portion width 560 to 0.5 multiplied by the lateral middle portion width 560. The first arcuate portion 556 may define a midpoint 562 and a midpoint tangent 564 that forms a first obtuse angle 566 with the flat middle portion 554 ranging from 100 degrees to 160 degrees (e.g. approximately 130 degrees). Likewise, the first arcuate portion 556 may also define an end point 568 and an end point tangent 570 that forms a second obtuse angle 572 with the midpoint tangent 564 ranging from 100 degrees to 160 degrees (e.g. approximately 130 degrees). As can be seen, the structure shown in FIG. 19 is substantially similar or identical to that of FIG. 3. Other configurations of the features of FIGS. 3 and 19 are possible in other embodiments of the present disclosure and may be different than each other.

Returning to FIG. 16, one of the pair of first leg side surfaces 514 may define a first keyway 574 defining a first opening 576 disposed proximate the nose portion 508 and extending along the direction of assembly 536 and terminating in a rear abutment surface 578. Also, a top flared wall 580 and a bottom flared wall 582 that partially defines the first keyway 574 are provided. The top flared wall 580 and the bottom flared wall 582 being configured to facilitate the attachment of a corner adapter cover 1000 (see FIGS. 23 thru 25). The other of the pair of first leg side surfaces 514 may define a second keyway 584 symmetrically configured as the first keyway 574. The keyways may provide adapter cover stability and support as the cover wears.

Now, an adapter 600 according to yet another embodiment of the present disclosure will be discussed with reference to FIGS. 2, 5, 6, 7, 16 and 18 that may be used for attaching a tool 118 to a work implement assembly 100d using a mounting mechanism 126. It should be noted that the adapter 600 may take the form of a center adapter or a corner adapter.

Looking at FIGS. 6, 7, and 16, the adapter 600 may comprise a body 202, 502 that includes a nose portion 204, 508 that is configured to facilitate the attachment of a tool 118, a first leg 206, 512, a second leg 210, 522, a throat portion 214, 526 that connects the legs 206, 512, 210, 522 and nose portion 204, 508 together. At least one of the first leg 206, 512 and the second leg 210, 522 defines an aperture 215, 528 that is configured to receive a mounting mechanism 126. The first and the second legs 206, 512, 210, 522 and the throat portion 214, 526 include an upper surface 602 and a lower surface 604 that at least partially define a slot 606 that includes a closed end 608 and an open end 610. The slot 606 may define a direction of assembly 612 onto a work implement assembly 100d, a lateral direction 614 that is perpendicular to the direction of assembly 612, and a vertical direction 616 that is perpendicular to the direction of assembly 612 and the lateral direction 614.

Focusing now on FIG. 5, the slot 606 defines a clearance void 618 disposed at the closed end 608 of the slot 606. The clearance void 618 is at least partially defined by the closed end 608 and at least one of the upper surface 602 and the lower surface 604. The body 202, 502 may also define a clearance void vertical extremity 620 and a clearance void height 622 measured in the vertical direction 616 from the at least one of the upper surface 602 and the lower surface 604 to the vertical extremity 620. The body 202, 502 may also define a clearance void width 624 measured along the direction of assembly 612 from the closed end 608 to the at least one of the upper surface 602 and the lower surface 604. A ratio of the clearance void width 624 to the clearance void height 622 may range from 2.0 to 3.0.

Furthermore, the body 202, 502 defines an arcuate boundary surface 626 that extends from the closed end 608 to the at least one of the upper surface 602 and the lower surface 604. The upper surface 602 may be a sloped surface 628 and the lower surface 604 is a horizontal surface 630. This may not be the case in other embodiments. The clearance void 618 may be an upper clearance void 618a and the arcuate boundary surface 626 extends from closed end 608 to the upper surface 602. Alternatively, the clearance void 618 may be a lower clearance void 618b and the arcuate boundary surface 626 extends from the closed end 608 to the lower surface 604.

Figure 8:
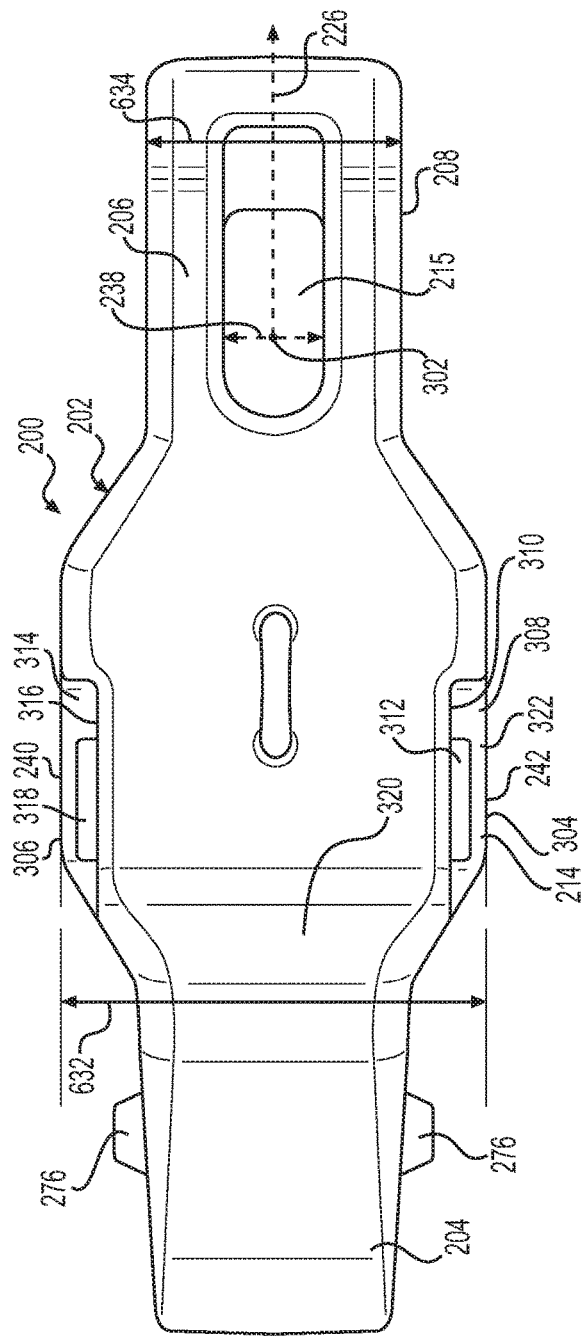
FIG. 8 is a top view of the center adapter of FIG. 6.
Figure 9:
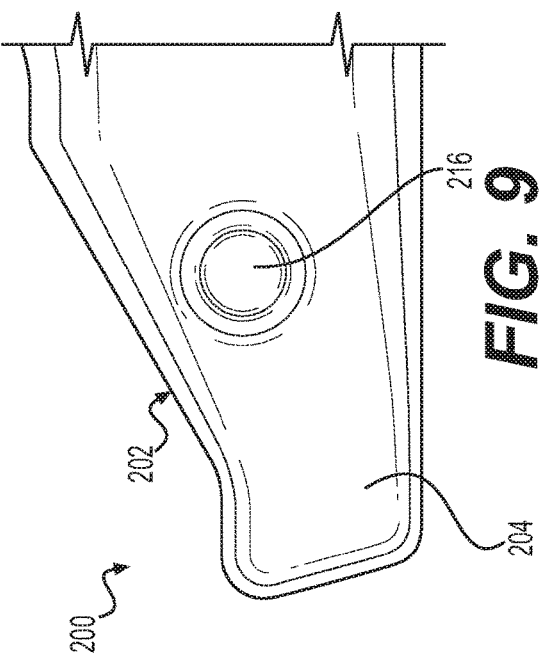
FIG. 9 is an enlarged side view of the nose portion of the center adapter of FIG. 6.
Figure 10:
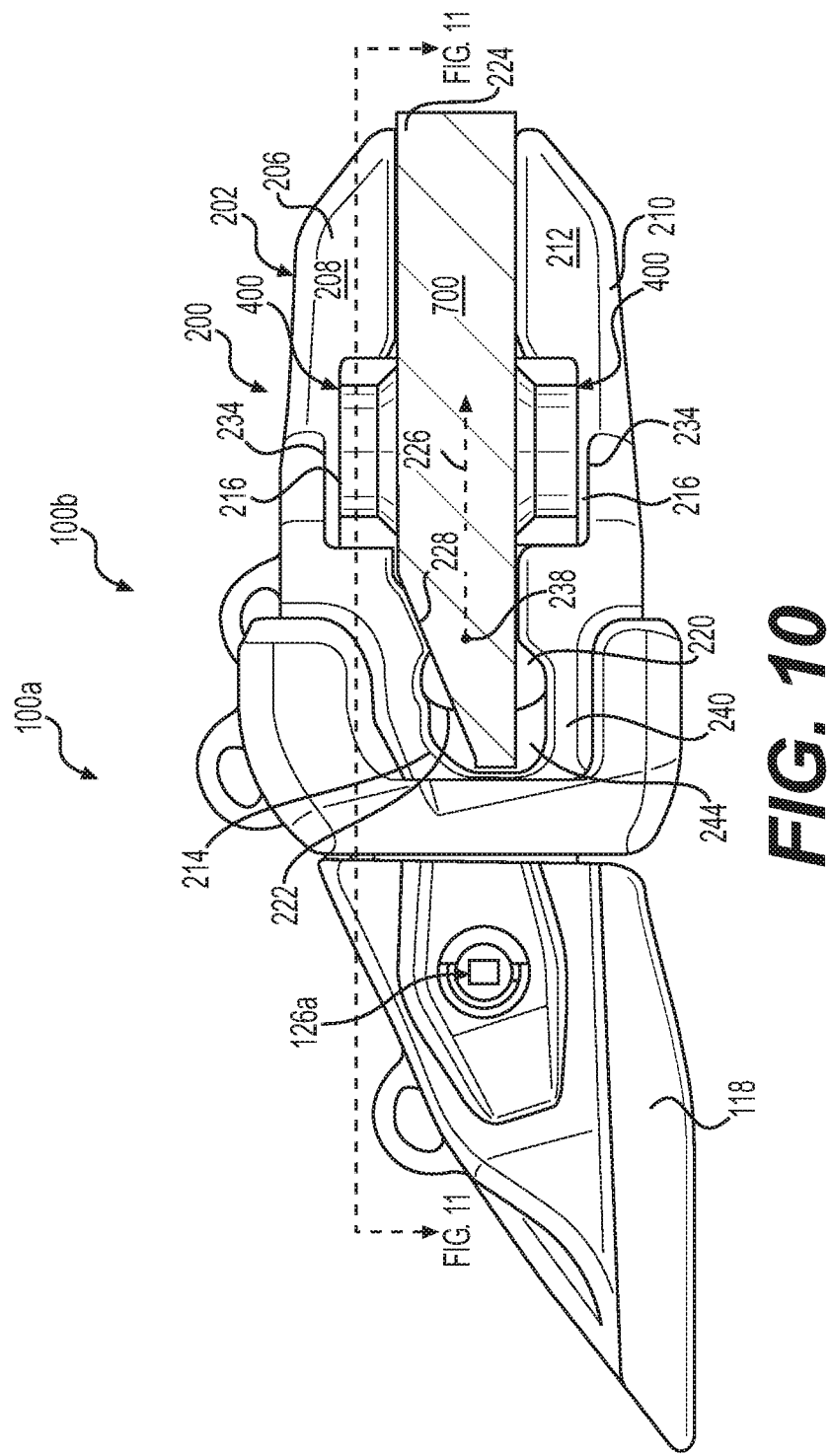
FIG. 10 is a side view of an instance of the center adapter, center tip, center adapter cover, notched base edge and load sharing block of the bucket assembly of FIG. 1.

Moreover, looking at FIG. 8, the body 202 may define a maximum body lateral width 632 and the first leg or the second leg defines a maximum leg lateral width 634 and a ratio of the maximum body lateral width 632 to the maximum leg lateral width 634 may range from 1.25 to 1.5.

Referring again to FIGS. 17, 18 and 29 thru 31, a work implement assembly 100c according to an embodiment of the present disclosure will now be described. As best seen in FIG. 18, the work implement assembly 100c may comprise a base edge 700, a corner adapter 500 attached to the base edge 700 making contact with the base edge 700 at a top front point 130. The corner adapter 500 may include a body 502 that defines a vertical direction 504, a horizontal direction 506, and a vertical plane 586 passing through the body 502. The body 502 may have a nose portion 508 that is configured to facilitate the attachment of a tool 118 and that defines a bottom front point 588.

As best understood with reference to FIG. 16, the body 502 may also include a first bifurcated leg 512 that includes a pair of first leg side surfaces 514 and that defines a vertical slot 516, splitting the first bifurcated leg 512 into a first fork portion 518 and a second fork portion 520, and a second leg 522 that includes a pair of second leg side surfaces 524. A throat portion 526 may connect the legs 512, 522 and nose portion 508, and at least one of the first fork portion 518 and the second fork portion 520 defines an aperture 528 that is configured to receive a horizontal mounting mechanism 126".

As illustrated in FIGS. 16 and 18, a tool 118 may be attached to the nose portion 508 of the corner adapter 500, and a side edge 120 may be inserted into the vertical slot 516. The first and the second legs 512, 522 and the throat portion 526 define a horizontal slot 530 that includes a closed end 532 and an open end 534. The horizontal slot 530 may define a direction of assembly 536 onto a work implement assembly 100c. The first bifurcated leg 512 includes a first sloped portion 538 disposed in the vertical slot 516 that contacts the side edge 120. The assembly 100c is configured such that when an upload is applied to the tool 118, there is a reactionary force at the bottom front point 588 of the adapter nose 508 and at the top front point 130 of the base edge 700 at the closed end 532 of the horizontal slot 530. A line 590 may be drawn through the top front point 130 of the base edge 700 and the bottom front point 588 of the nose portion 508 forms a wedge angle 592 in the vertical plane 586 with the first sloped portion 538 ranging from 30 degrees to 80 degrees (e.g. approximately 55 degrees), thereby creating a wedge configuration into which the corner adapter is pushed.

The first sloped portion 538 may form a first acute angle 540 with the direction of assembly 536 ranging from 20 degrees to 40 degrees (e.g. approximately 30 degrees). The base edge 700 may include a chamfer 706' and the first leg 512 may define a second sloped portion 594 contacting the chamfer 706'.

Now, a base edge 700 according to various embodiments of the present disclosure will be discussed in reference to FIGS. 20 thru 22. The base edge 700 may have a body 708 including a working edge 710 defining a lateral direction 712 and a direction of assembly 714 (so called as this is the direction an adapter or a tool is attached to the base edge) perpendicular to the lateral direction 712. The body 708 may further define a first lateral end 716, a second lateral end 718, a plurality of vertical mounting mechanism receiving apertures 720, a plurality of center notches 702 (so called since the center notches are spaced away from the lateral ends), extending from the working edge 710, and a first end notch 724 disposed proximate to the first lateral end 716, and a second end notch 724' disposed proximate to the second lateral end 718. The first end notch 724 and the second end notch 724' may also extend from the working edge 710.

Figure 22:
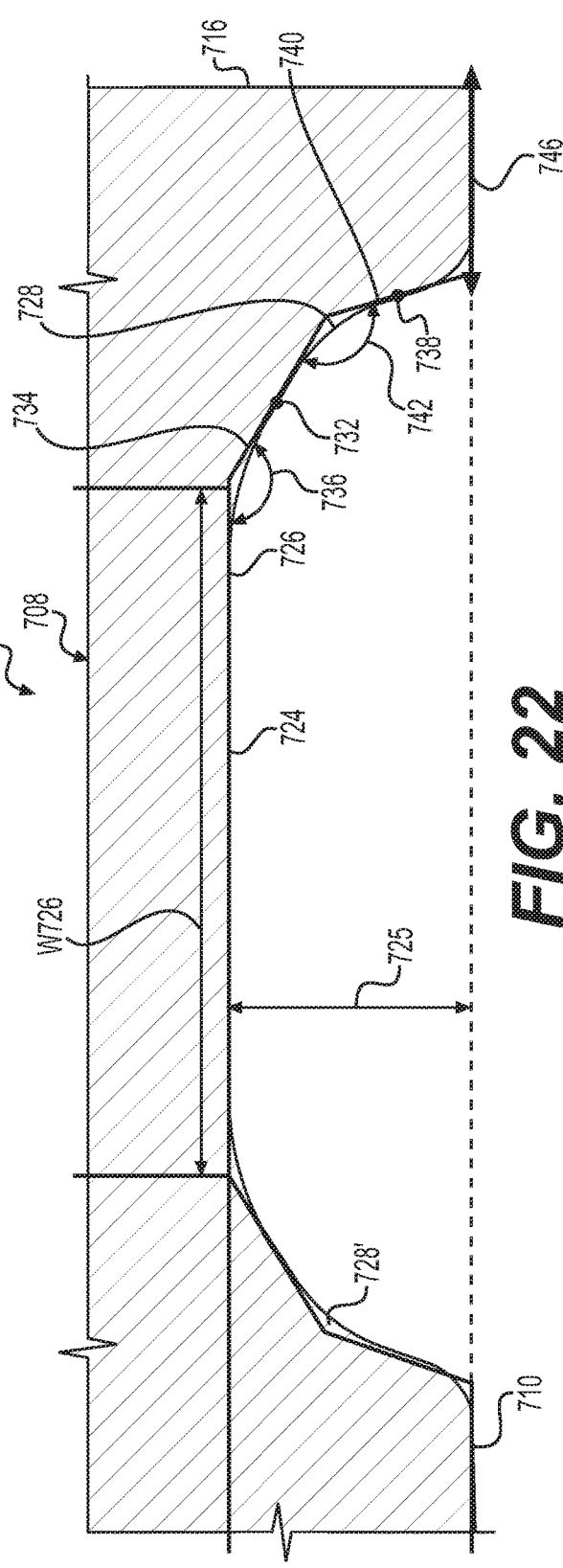
FIG. 22 is an enlarged top detail view of the notched base edge of FIG. 21 showing the corner notch more clearly.

Each of the plurality of center notches 702 and the first and the second end notches 724, 724' may include the same configuration, defining a notch depth 725 along direction of assembly 714 (see FIG. 22). Each of the plurality of center notches 702 and the first and the second end notches 724, 724' may further include a straight middle portion 726 straddled laterally by a first arcuate corner portion 728 and a second arcuate corner portion 728'. The straight middle portion 726 may define a lateral straight middle portion width W726, and the notch depth 725 may range from 0.1 multiplied by the lateral straight middle portion W730 width to 0.5 multiplied by the lateral straight middle portion width W726.

The first arcuate corner portion 728 may define an arc midpoint 732 and an arc midpoint tangent 734 that forms a first angle 736 with the straight middle portion 730 ranging from 100 degrees to 160 degrees (e.g. approximately 130 degrees). The first arcuate corner portion 728 may also define an arc end point 738 and an arc end point tangent 740 that forms a second angle 742 with the arc midpoint tangent 734 ranging from 100 degrees to 160 degrees (e.g. approximately 130 degrees).

Figure 20:
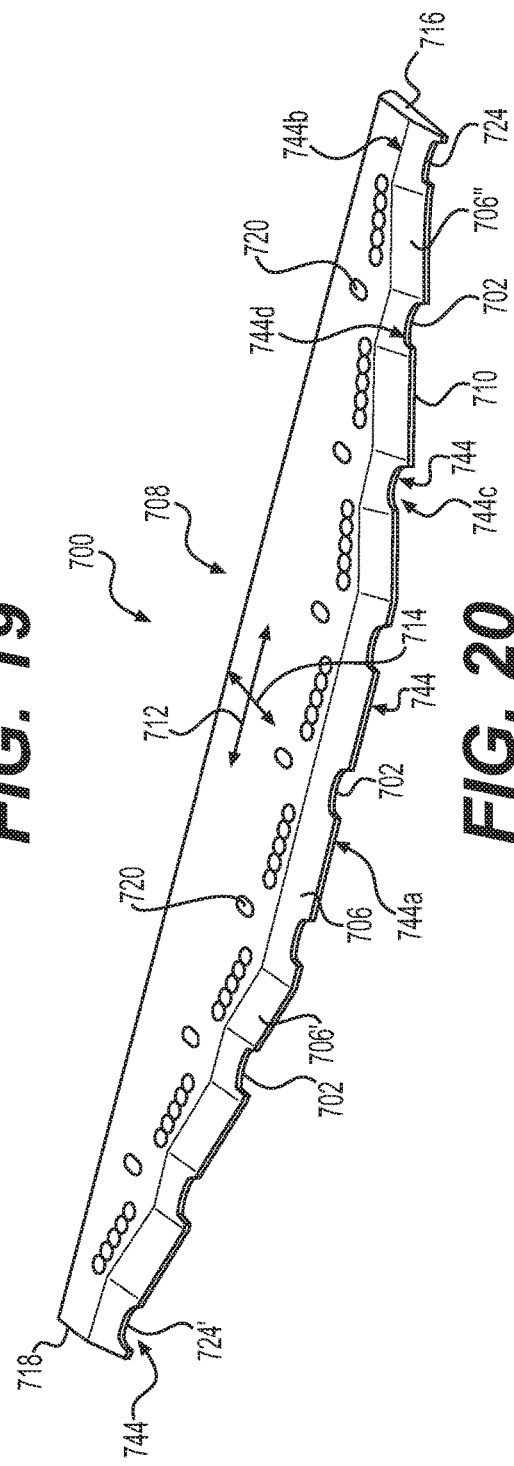
FIG. 20 is a perspective view of the notched base edge of the bucket assembly of FIG. 1 shown in isolation.
Figure 21:
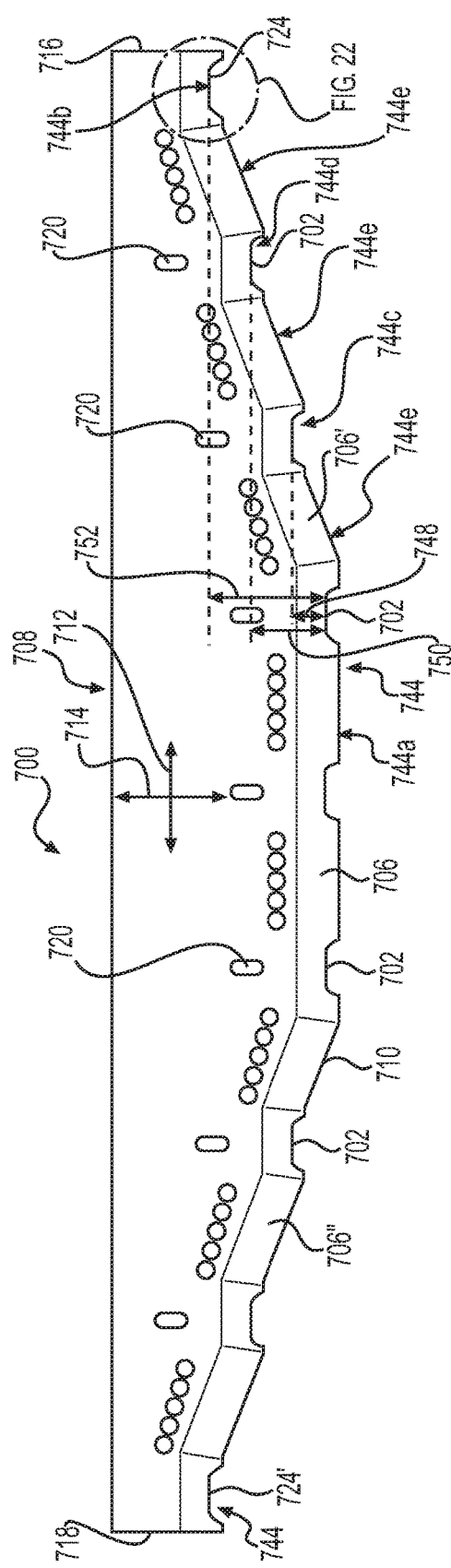
FIG. 21 is a top view of the notched base edge of FIG. 20.

Looking at FIGS. 20 and 21, the body may also include a chamfer surface 706" extending from the working edge 710 that at least partially bounds each of the plurality of center notches 722 and each of the first end notch 724 and the second end notch 724'.

In addition, the working edge 710 may be divided into a plurality of zones 744 disposed along the lateral direction 712 and offset from each other along the direction of assembly 714. The plurality of zones 744 may include a center zone 744a including three of the plurality of center notches 722 that are linearly laterally aligned. The plurality of zones 744 may also include a first end zone 744b that includes the first end notch 724 that is spaced away from the first lateral end a first end distance 746 that may range from 20 mm to 60 mm (see FIG. 21). The plurality of zones 744 also includes a first intermediate zone 744c disposed laterally between the center zone 744a and the first end zone 744b, and a second intermediate zone 744d disposed laterally between the first intermediate zone 744c and the first end zone 744b. The first intermediate zone 744c may be offset along the direction of assembly 714 a first offset distance 748 and the second intermediate zone 744d may be offset from the center zone 744a a second offset distance 750. The first end zone 744b may be offset from the center zone 744a a third offset distance 752. The third offset distance 752 may be greater than the second offset distance 750, and the second offset distance 750 may be greater than the first offset distance 748. Other configurations are possible in other embodiments of the present disclosure.

Moreover, the plurality of zones 744 includes a plurality of angled zones 744e. One of the plurality of angled zones 744e may be disposed between the center zone 744a and the first intermediate zone 744c. Another one of the plurality of angled zones 744e may be disposed between the first intermediate zone 744c and the second intermediate zone 744d. A third one of the plurality of angled zones 744e may be disposed between the second intermediate zone 744d and the first end zone 744b. The center zone 744a may define a center zone midpoint 754 and the body 708 may define a plane of symmetry 756 passing through the center zone midpoint 754. This may not the base for other embodiments.

Referring to FIGS. 2, 3, 6, 16 and 19, an adapter 800 that may take the form of a center adapter or a corner adapter, etc. and that may mate with the base edge 700 just described above will now be discussed. The adapter 800 may comprise a body 802 that includes a nose portion 804 that is configured to facilitate the attachment of a tool 118, a first leg 806, a second leg 808, and a throat portion 810 that connects the legs 806, 808 and nose portion 804 together. At least one of the first leg 806 and the second leg 808 may define an aperture 812 that is configured to receive a mounting mechanism 126.

The first and the second legs 806, 808 and the throat portion 810 may define a slot 814 that includes a closed end 816 and an open end 818. The slot 814 defines a direction of assembly 820 onto a work implement assembly, and lateral direction 822 that is perpendicular to the direction of assembly 820, and the throat portion 810 further comprises a first throat side surface 824 disposed along the lateral direction 822 and a second throat side surface 824' disposed on the opposite side of the throat portion 810 along the lateral direction 822. The throat portion 810 further comprises a protrusion 826 disposed at the closed end 816 of the slot 814. The protrusion 826 may extend along the direction of assembly 820 and along the lateral direction 822 proximate to the first throat side surface 824 and proximate to the second throat side surface 824'. Other configurations are possible in other embodiments of the present disclosure.

The protrusion 826 may define a protrusion height 828 along the direction of assembly 820. The protrusion 826 may further include a flat middle portion 830 straddled laterally by a first arcuate portion 832 and a second arcuate portion 832'. The flat middle portion 830 may define a middle lateral width 834, and the protrusion height 828 may range from 0.1 multiplied by the middle lateral width 834 to 0.5 multiplied by the middle lateral width 834. These dimensions and ratios may be altered to be different in other embodiments of the present disclosure.

The first arcuate portion 832 may define a midpoint 835 and a midpoint tangent 836 that forms a first obtuse angle 838 with the flat middle portion 830 ranging from 100 degrees to 160 degrees (e.g. approximately 130 degrees). The first arcuate portion 832 may also define an end point 840 and an end point tangent 842 that forms a second obtuse angle 844 with the midpoint tangent 836 ranging from 100 degrees to 160 degrees (e.g. approximately 130 degrees).

In FIGS. 2, 3, 6, and 16 thru 19, a work implement assembly 100d may use an adapter 800 and a base edge 700 similar to those just described. More specifically, the work implement assembly 100d may comprise a notched base edge 700a defining a notch 701, and an adapter 800 attached to the notched base edge 700a. The adapter 800 may include a body 802 that includes a nose portion 804 that is configured to facilitate the attachment of a tool 118, a first leg 806, a second leg 808, and a throat portion 810 that connects the legs 806, 808 and the nose portion 804 together. At least one of the first leg 806 and the second leg 808 defines an aperture 812 that is configured to receive a mounting mechanism 126.

The first and the second legs 806, 808 and the throat portion 810 may define a slot 814 that includes a closed end 816 and an open end 818. The slot 814 may also define a direction of assembly 820 onto the work implement assembly 100d and a lateral direction 822 that is perpendicular to the direction of assembly 820. The throat portion 810 further comprises a first throat side surface 824 disposed along the lateral direction 822 and a second throat side surface 824' disposed on the opposite side of the throat portion 810 along the lateral direction 822. The throat portion 810 may further comprise a protrusion 826 disposed at the closed end 816 of the slot 814. The protrusion 826 extends along the direction of assembly 820 and along the lateral direction 822 proximate to the first throat side surface 824 and proximate to the second throat side surface 824'.

The protrusion 826 may define a protrusion height 828 along the direction of assembly 820. The protrusion 826 may further include a flat middle portion 830 straddled laterally by a first arcuate portion 832 and a second arcuate portion 832'. The flat middle portion 830 may define a middle lateral width 834, and the protrusion height 828 may range from 0.1 multiplied by the middle lateral width 834 to 0.5 multiplied by the middle lateral width 834.

The first arcuate portion 832 may define a midpoint 835 and a midpoint tangent 836 that forms a first obtuse angle 838 with the flat middle portion 830 ranging from 100 degrees to 160 degrees (e.g. approximately 130 degrees). The first arcuate portion 832 also defining an end point 840 and an end point tangent 842 that forms a second obtuse angle 844 with the midpoint tangent 836 ranging from 100 degrees to 160 degrees (e.g. approximately 130 degrees). The notch 701 of the notched base edge 700a may be complimentarily configured to the protrusion 826 (e.g. designed line to line), making contact with the protrusion 826. Other configurations and fits are possible in other embodiments of the present disclosure.

Figure 2:
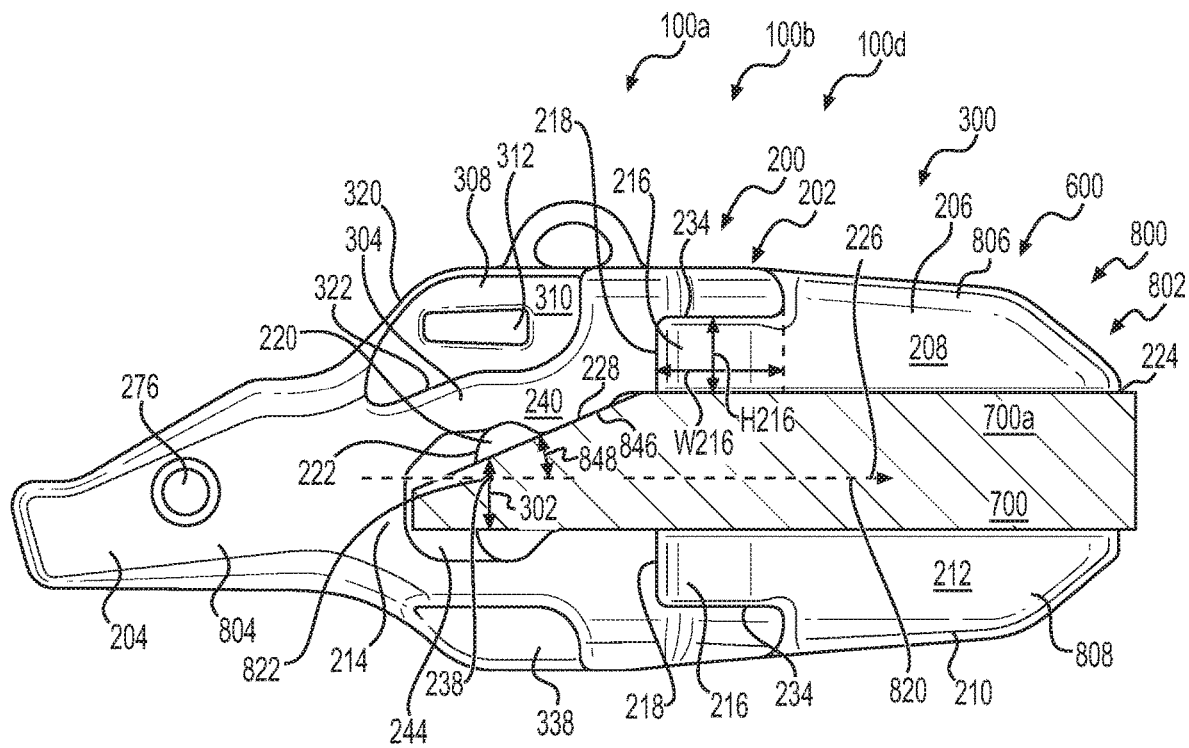
FIG. 2 is a side view of a center adapter mounted onto a notched base edge removed from the bucket assembly of FIG. 1.

As best seen in FIGS. 2 and 18, the first leg 806 may include a sloped portion 846 disposed adjacent the closed end 816 along the direction of assembly 820. The sloped portion 846 may form a first oblique angle 848 with the direction of assembly 820, partially defining the slot 814. The first oblique angle 848 may range from 20 degrees to 40 degrees. The sloped portion 846 may contact the top beveled surface 706 of the notched base edge 700a.

As best seen in FIGS. 20 and 21, the notched base edge 700*a* may include a front portion 704 including a working edge 710. The notched base edge 700*a* also has a plurality of center notches 722 and a first end notch 724. The top beveled surface 706 extends from the working edge 710 and at least partially bounds each of the plurality of center notches 722 and the first end notch 724. The notch 701 may be a center notch 722 or a first end notch 724.

The working edge 710 is divided into a plurality of zones 744 offset from each other including a center zone 744*a* including three of the plurality of center notches 722 that are linearly aligned, and a first end zone 744*b* that includes the first end notch 724 that is spaced away from the first lateral end 716 a first end distance 746 ranging from 20 mm to 60 mm.

The plurality of zones 744 includes a first intermediate zone 744*c* disposed laterally between the center zone 744*a* and the first end zone 744*b*, and a second intermediate zone 744*d* disposes laterally between the first intermediate zone 744*c* and the first end zone 744*b*. The first intermediate zone 744*c* is offset along the direction of assembly 820 a first offset distance 748 and the second intermediate zone 744*c* is offset from the center zone 744*a* a second offset distance 750. The first end zone 744*b* is offset from the center zone 744*a* a third offset distance 752. The third offset distance 752 may be greater than the second offset distance 750, and the second offset distance 750 may be greater than the first offset distance 748.

Turning now to FIGS. 26 thru 28, and 31 thru 34, various embodiments of an adapter cover 900, which may take the form of a center adapter cover 900', or a corner adapter cover, will now be discussed in detail.

Figure 27:
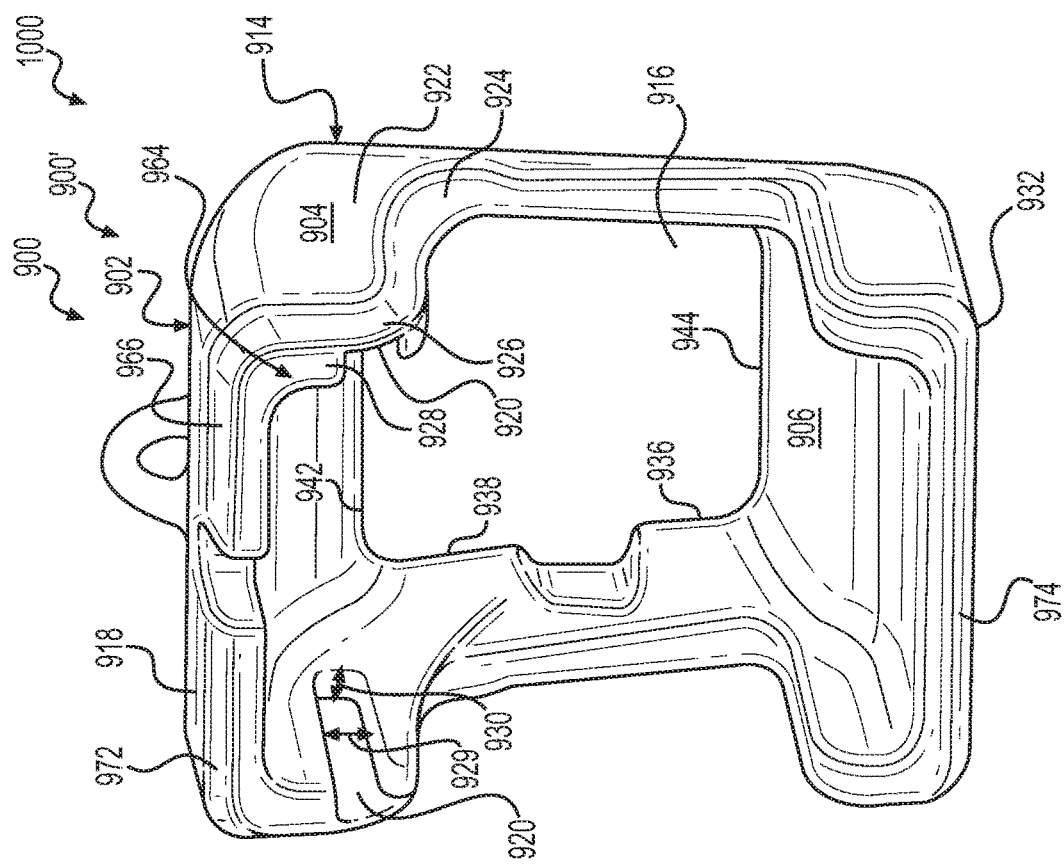
FIG. 27 is a rear oriented perspective view of the center adapter cover of FIG. 23.
Figure 26:
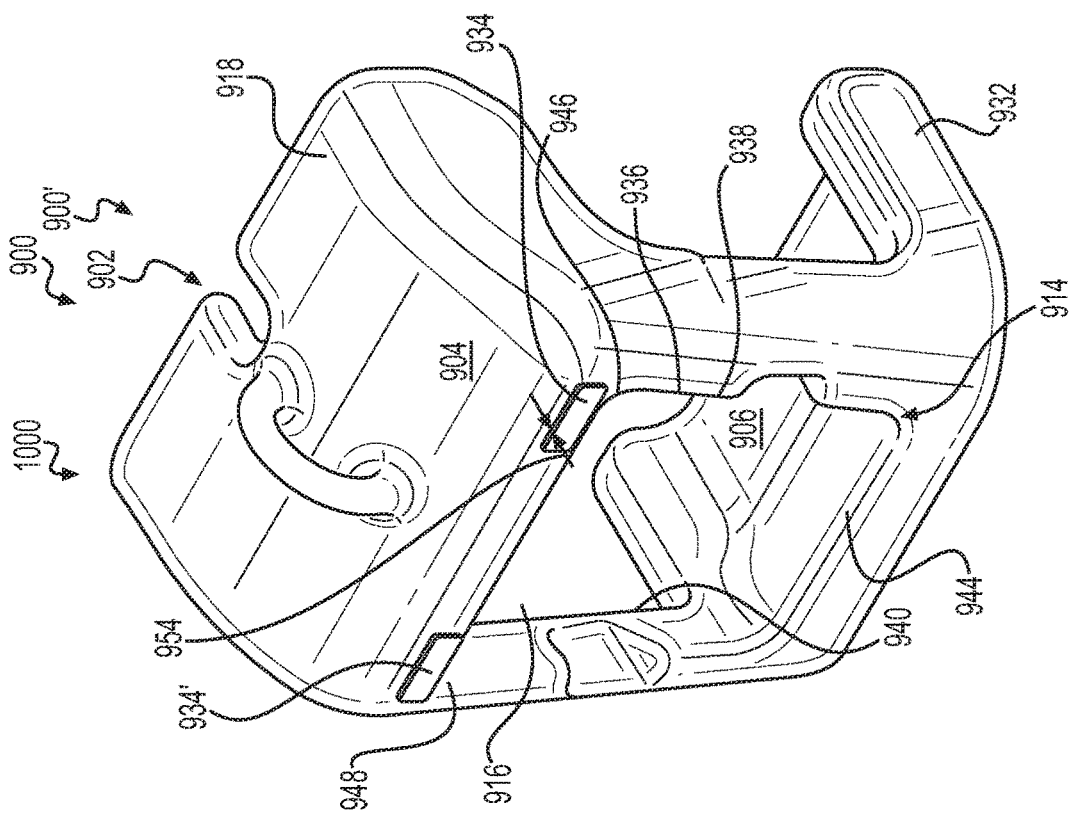
FIG. 26 is a front oriented perspective view of the center adapter cover of FIG. 23.
Figure 28:
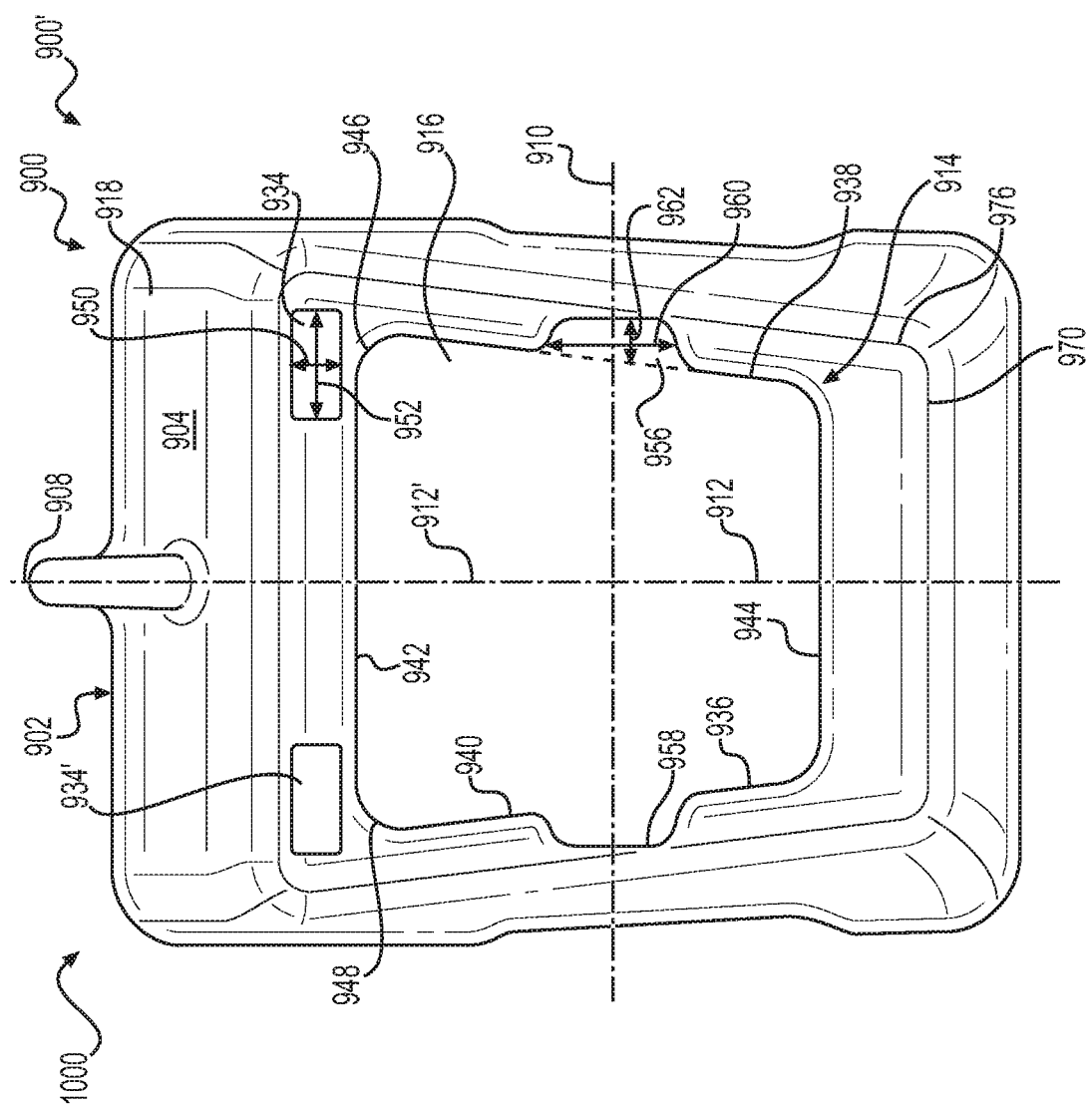
FIG. 28 is a front view of the center adapter cover of FIG. 23.

Focusing on FIGS. 26 thru 28, an adapter cover 900 may comprise a shell body 902 including an exterior surface 904 and an interior surface 906. As best seen in FIG. 28, the shell body 902 may define a vertical direction 908, a horizontal direction 910, and a vertical plane 912. The vertical plane 912 may define a plane of symmetry 912' for the adapter cover 900 but not necessarily so.

With continued reference to FIGS. 26 thru 28, the shell body 902 may further comprise a front face portion 914 defining a thru-hole 916 configured to allow a nose portion 804 of an adapter 800 to pass horizontally through the thru-hole 916 past the interior surface 906 and then past the exterior surface 904.

Also, the shell body 902 may have a top leg 918 extending horizontally from the front face portion 914 that defines an adapter key receiving recess 920 on the interior surface 906, and that has a top leg side portion 922 defining a concave arcuate portion 924 extending rearward from the front face portion 914, and a convex arcuate portion 926 extending horizontally from the concave arcuate portion 924, terminating in a vertical rear surface 928. The adapter key receiving recess 920 may extend to the vertical rear surface 928 and may define a vertical opening dimension 929 ranging from 15 mm to 35 mm and a horizontal recess depth 930 ranging from 10 mm to 20 mm.

In addition, the shell body 902 may also include a bottom leg 932 extending horizontally from the front face portion 914 and a first stabilization pad 934 extending forwardly from the front face portion 914. A second stabilization pad 934' may also extend forwardly from the front face portion 914 that is similarly or identically configured as the first stabilization pad 934.

As best seen in FIG. 28, the thru-hole 916 may define a trapezoidal perimeter 936 with a right side edge 938, a left side edge 940, a top edge 942, a bottom edge 944, an upper right corner 946 and an upper left corner 948. The first stabilization pad 934 may be positioned proximate to the upper right corner 946 along the top edge 942 and the second stabilization pad 934' may be positioned proximate to the upper left corner 948 along the top edge 942.

The first stabilization pad 934 may define a vertical pad height 950 ranging from 10 mm to 20 mm and a horizontal pad width 952 ranging from 30 mm to 50 mm. Also, the amount 954 that the first stabilization pad 934 is proud from the front face portion 914 may also range from 1 mm to 5 mm (see FIG. 32).

In FIG. 28, the shell body 902 may further define a right side notch 956 extending horizontally from the right side edge 938 and a left side notch 958 extending horizontally from the left side edge 940. The right side notch 956 may define a vertical notch height 960 ranging from 30 mm to 55 mm and a horizontal notch width 962 ranging from 15 mm to 50 mm.

FIG. 27 shows that the top leg 918 may terminate along the horizontal direction (or plane) in a U-shaped portion 964 and may further comprise a chamfer 966 extending horizontally from the rear U-shaped portion 964 toward the front face portion 914.

Any of the features or dimension just mentioned may be differently configured in other embodiments of the present disclosure or may be omitted, etc.

With continued reference to FIGS. 26 thru 28, another embodiment of an adapter cover 900 will also be described. The adapter cover 900 may comprise a shell body 902 that includes an exterior surface 904 and an interior surface 906. The shell body 902 may also define a vertical direction 908, a horizontal direction 910, and a vertical plane 912 (may take the form of a plane of symmetry 912').

The shell body 902 may also include a front face portion 914 may define a thru-hole 916 that is configured to allow a nose portion 804 of an adapter 800 to pass horizontally through the thru-hole 916 past the interior surface 906 and then past the exterior surface 904. The thru-hole 916 may define a trapezoidal perimeter 936 with a right side edge 938, a left side edge 940, a top edge 942, a bottom edge 944, an upper right corner 946 and an upper left corner 948. The first stabilization pad 934 may be positioned proximate to the upper right corner 946 along the top edge 942 and the second stabilization pad 934' may be positioned proximate to the upper left corner 948 along the top edge 942.

The first stabilization pad 934 may define a vertical pad height 950 and a horizontal pad width 952. A ratio of the horizontal pad width 952 to the vertical pad height 950 may range from 2.0 to 3.0. Other ratios are possible in other embodiments of the present disclosure.

The shell body 902 may also have a top leg 918 extending horizontally from the front face portion 914, and a bottom leg 932 extending horizontally from the front face portion 914. The top leg 918 may define an adapter key receiving recess 920 on the interior surface 906 and a top leg side portion 922 that defines a concave arcuate portion 924 extending rearward from the front face portion 914. A convex arcuate portion 926 may extend horizontally from the concave arcuate portion 924, terminating in a vertical rear surface 924. Other configurations are possible in other embodiments of the present disclosure.

FIGS. 23 thru 25 illustrate a work implement assembly 100*e* that may use a center adapter cover 900' such as that shown in FIGS. 26 thru 28. The work implement assembly 100*e* may comprise a base edge 700, and a center adapter 200 attached to the base edge 700.

As best seen in FIGS. 6 and 7, the center adapter 200 may include a body 202 that has a nose portion 204 that is configured to facilitate the attachment of a tool 118 (shown in FIGS. 23 thru 25), a first leg 206 that includes a pair of first leg opposing side surfaces 208', a second leg 210 that includes a pair of second leg opposing side surfaces 210', and a throat portion 214 that connects the legs 206, 210 and nose portion 204 together.

With continued reference to FIGS. 6 and 7, at least one of the first leg 206 and the second leg 210 defines an aperture 215 that is configured to receive a mounting mechanism 126. The body 202 may define a first top pocket 216a that defines a first top pocket arcuate abutment surface 218a disposed adjacent one of the pair of first leg opposing side surfaces 208'. Also, the first and the second legs 206, 210 and the throat portion 214 define a slot 220 that includes a closed end 222 and an open end 224. The slot 220 may define a direction of assembly 226 onto a work implement assembly 100e. The body 202 may define a top center adapter cover receiving recess 308' and a bottom center adapter receiving recess 309.

Focusing now on FIGS. 26 thru 28, the work implement assembly 100e may further include a center adapter cover 900' includes a shell body 902 with an exterior surface 904 and an interior surface 906. The shell body 902 may also define a vertical direction 908, a horizontal direction 910, and a vertical plane 912 (may be a plane of symmetry 912'). The shell body may also have a front face portion 914 defining a thru-hole 916 configured to allow the nose portion 204 of the center adapter 200 to pass horizontally through the thru-hole 916 past the interior surface 906 and then past the exterior surface 904. In addition, a top leg 918 may extend horizontally from the front face portion 914, and a bottom leg 932 may also extend horizontally from the front face portion 914.

Referring back to FIGS. 23 thru 25, the center adapter cover 900' may be sandwiched between the tool 118 and the center adapter 200. The top leg 918 of the center adapter cover 900' may be resting at least partially in the top center adapter cover receiving recess 308' of the center adapter 200 and the bottom leg 932 may be resting at least partially in the bottom center adapter receiving recess 309. The center adapter 200 may include a top surface 320 and the top leg 918 of the center adapter cover 900' may rise vertically above the center adapter 200 while the bottom leg 932 of the center adapter cover 900' may extend vertically below the center adapter 200. This may help to protect the adapter as material passes over and underneath the cover (see material flow path 136 in FIG. 23).

To that end, the tool 118 may define a tool top surface 132 and the center adapter cover 900' may define a cover top surface 966 that blends with the tool top surface 132. The tool 118 may also defines a tool bottom surface 134 while the center adapter cover 900' defines a cover bottom surface 968 that is at least partially parallel with the tool bottom surface 134. Other configurations for these various features are possible in other embodiments.

Other features will now be described that may allow material to flow along the material flow path 136, etc. over the adapter and cover. For example, the front face portion 914 may include a front radial surface 970 interposed between the tool top surface 132 and the cover top surface 966. Hence, these features may be configured to provide a material flow path 136 along the tool top surface 132 over the cover top surface 966. Moreover, the front face portion 914 of the center adapter cover 900' defines a front face portion perimeter 976 and the front radial surface 970 may extend completely along the front face portion perimeter 976 (see FIG. 28). Looking at FIG. 25, the tool 118 may also include a pair of tool side surfaces 138 and the front radial surface 970 may be configured to allow material to flow past the tool side surfaces 138 and past the center adapter cover 900'.

Other features may be provided that allow a reversal of the flow of material. For example, the top leg 918 of the center adapter cover 900' defines a top rear chamfer 972 that is angled from the cover top surface 966 toward the first leg 206 of the center adapter 200. Similarly, the bottom leg 932 of the center adapter cover 900' defines a bottom rear chamfer 974 that is angled from the cover 900' from the cover bottom surface 968 toward the second leg 210 of the center adapter 200.

Referring back to FIGS. 26 thru 28, and 32 thru 34, yet another embodiment of an adapter cover 1000 may be seen that may take the form of a center adapter cover or a corner adapter cover. Focusing on FIGS. 32 thru 34, the adapter cover 1000 may comprise a shell body 1002 including an exterior surface 1004 and an interior surface 1006. The shell body 1002 may also define a vertical direction 1008, a horizontal direction 1010, and a vertical plane 1012 (may be a plane of symmetry 1012' but not necessarily so, see FIG. 34). The shell body 1002 may also comprise a front face portion 1014 defining a thru-hole 1016 configured to allow a nose portion 508 of an adapter 500 to pass horizontally through the thru-hole 1016 past the interior surface 1006 and then past the exterior surface 1004. A top leg 1018 may be provided extending horizontally from the front face portion 1014 and defining an adapter cover key 1020 on the interior surface 1006. Also, a top leg side portion 1022 may be provided defining a concave arcuate portion 1024 extending rearward from the front face portion 1014. A convex arcuate portion 1026 may extend horizontally from the concave arcuate portion 1024, terminating in a vertical rear surface 1028. The shell body 1002 may also include a bottom leg 1030 extending horizontally from the front face portion 1014.

Looking at FIG. 33, the adapter cover key 1020 may be spaced away from the vertical rear surface 1028 and may define a vertical adapter key dimension 1032 ranging from 40 mm to 60 mm, and a horizontal key height 1034 ranging from 25 mm to 35 mm. A ratio of the horizontal key height 1034 to the vertical adapter key dimension 1032 may range from 1.5 to 3.0. Other dimensions and ratios are possible in other embodiments.

Figure 34:
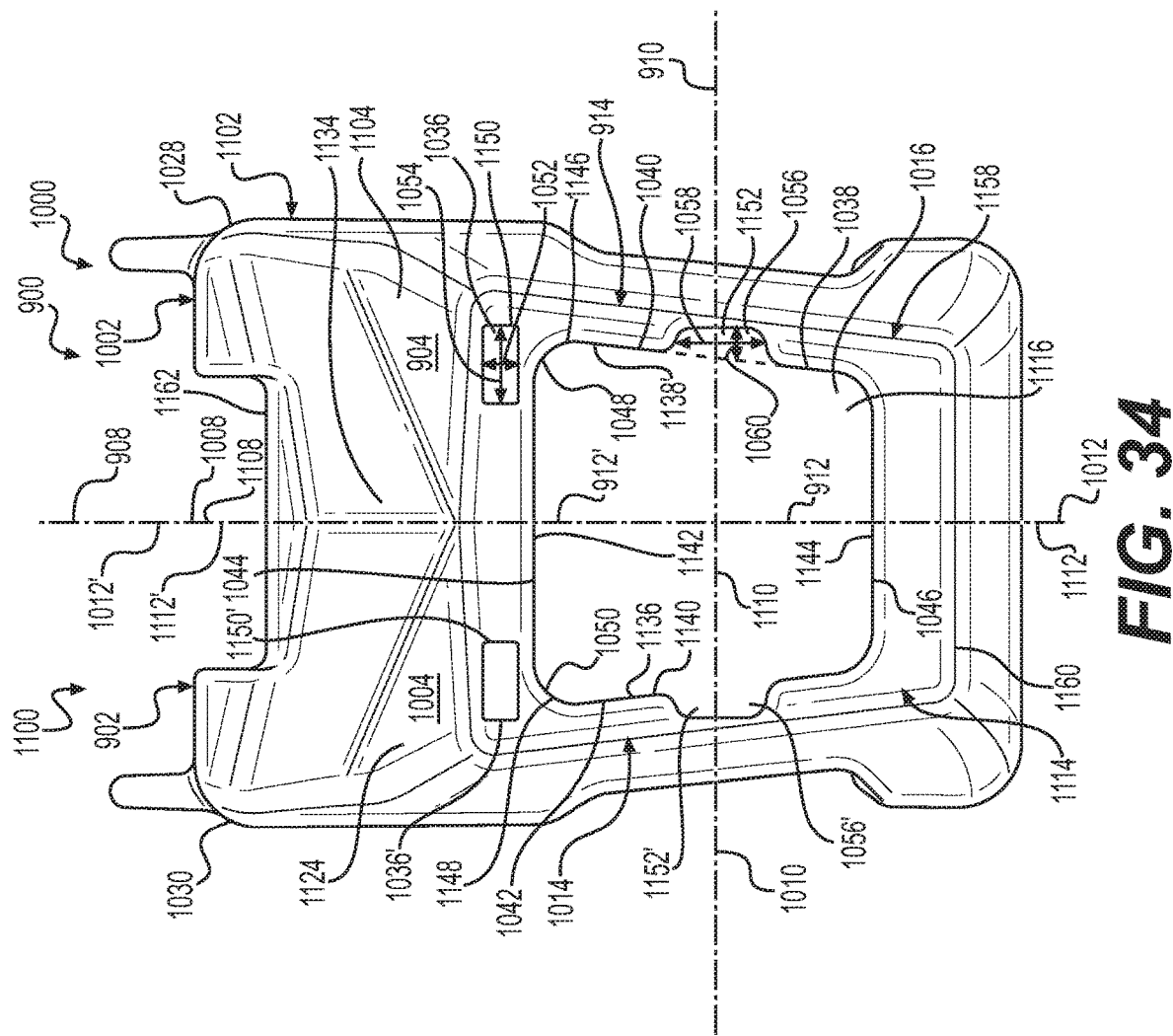
FIG. 34 is a front view of the corner adapter cover of FIG. 29.

As depicted in FIG. 34, the shell body 1002 may also include a first stabilization pad 1036 extending forwardly from the front face portion 1014 and a second stabilization pad 1036' extending forwardly from the front face portion 1014. The thru-hole 1016 may define a trapezoidal perimeter 1038 with a right side edge 1040, a left side edge 1042, a top edge 1044, a bottom edge 1046, an upper right corner 1048 and an upper left corner 1050. The first stabilization pad 1036 may be positioned proximate to the upper right corner 1048 along the top edge 1044 and the second stabilization pad 1036' may be positioned proximate to the upper left corner 1050 along the top edge 1044.

The first stabilization pad 1036 may define a vertical pad height 1052 ranging from 10 mm to 20 mm, and a horizontal pad width 1054 ranging from 30 mm to 50 mm. A ratio of the vertical pad height 1052 to the horizontal pad width 1054 may range from 0.5 to 0.33. Other dimensions and ratios may be employed for other embodiments of the present disclosure.

In addition, the shell body 1002 may further define a right side notch 1056 extending horizontally from the right side edge 1040 and a left side notch 1056' extending horizontally from the left side edge 1042. The right side notch 1056 may define a vertical notch height 1058 ranging from 30 mm to 55 mm and a horizontal notch width 1060 ranging from 5 mm to 15 mm. A ratio of the vertical notch height 1058 to the horizontal notch width 1060 may range from 3.0 to 6.0. These dimensions and ratios may be different for other embodiments of the present disclosure.

The top leg 1018 may terminate along the horizontal direction 1010 (or plane) in a U-shaped portion 1062. The top leg 1018 may further comprise a chamfer 1064 extending horizontally from the rear U-shaped portion 1062 toward the front face portion 1014.

With continued reference to FIGS. 32 thru 34, a corner adapter cover 1100 according to various embodiments of the present disclosure will now be described. The corner adapter cover 1100 may comprise a shell body 1102 including an exterior surface 1104 and an interior surface 1106. The shell body 1102 may define a vertical direction 1108, a horizontal direction 1110, and a vertical plane 1112 (may be referred to as a plane of symmetry 1112' in some embodiments).

The shell body 1102 may have a front face portion 1114 defining a thru-hole 1116 configured to allow a nose portion 508 of an adapter 500 to pass horizontally through the thru-hole 1116 past the interior surface 1106 and then past the exterior surface 1104.

The shell body 1102 may also include a top bifurcated leg 1122 extending horizontally from the front face portion 1114. The top bifurcated leg 1122 may include a shelf 1124 spanning horizontally along the front face portion 1114, and define a top vertical slot 1126 splitting the top bifurcated leg 1122 into a right fork portion 1128 and a left fork portion 1130. A bottom leg 1132 may extend horizontally from the front face portion 1114 as well.

The top bifurcated leg 1122 may include a V-shaped pad 1134 disposed on top of the shelf 1124, and the right fork portion 1128 and the left fork portion 1130 may extend from the shelf 1124. Also, the top bifurcated leg 1122 may further define a cutout 1136 extending horizontally on top of the V-shaped pad 1134 and through the V-shaped pad 1134.

As alluded to earlier herein, the thru-hole 1116 may define a trapezoidal perimeter 1136 with a right side edge 1138, a left side edge 1140, a top edge 1142, a bottom edge 1144, an upper right corner 1146, and an upper left corner 1148. The corner adapter cover 1100 further comprising a first stabilization pad 1150 disposed proximate to the upper right corner 1146 along the top edge 1142 and a second stabilization pad 1150' disposed proximate to the upper left corner 1148 along the top edge 1142. The shell body 1102 may further define a right side notch 1152 extending horizontally from the right side edge 1138 and a left side notch 1152' extending horizontally from the left side edge 1140.

Figure 29:
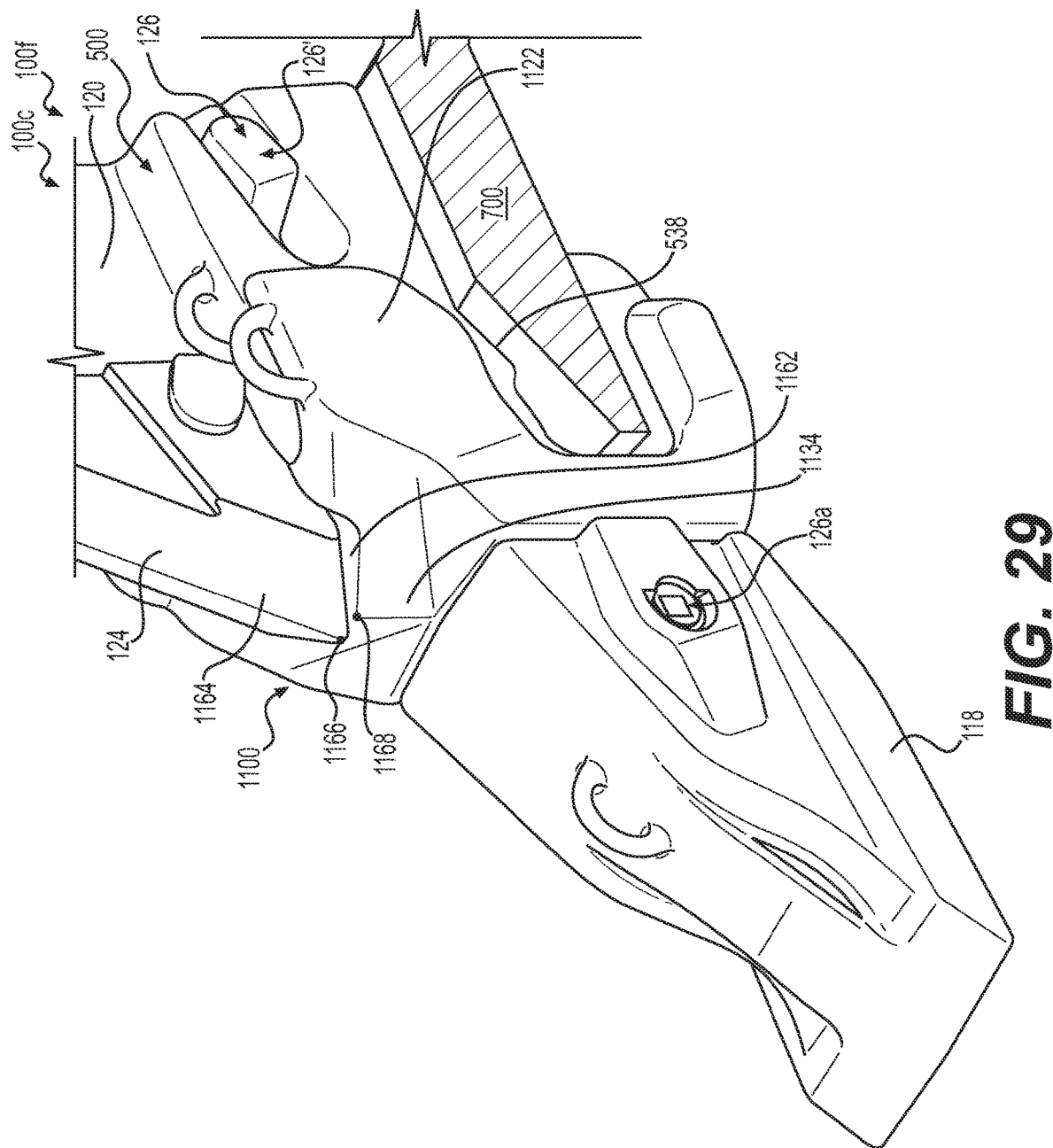
FIG. 29 is a perspective view of an instance of the corner tip, the corner adapter cover, the corner adapter, a side edge, the horizontal mounting mechanism, and the notched base edge of the bucket assembly of FIG. 1 removed from the bucket assembly.
Figure 30:
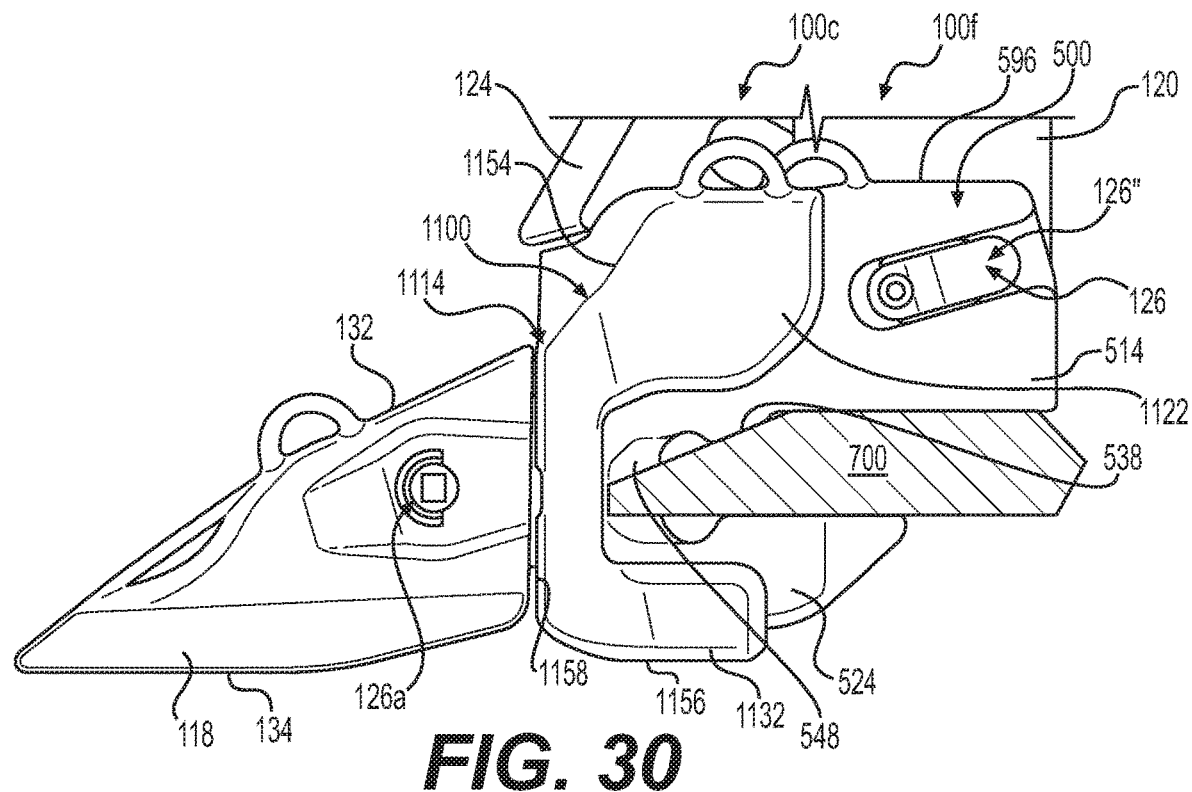
FIG. 30 is a side view of the corner tip, the corner adapter cover, the corner adapter, the side edge, the horizontal mounting mechanism, and the notched base edge of FIG. 29.
Figure 31:
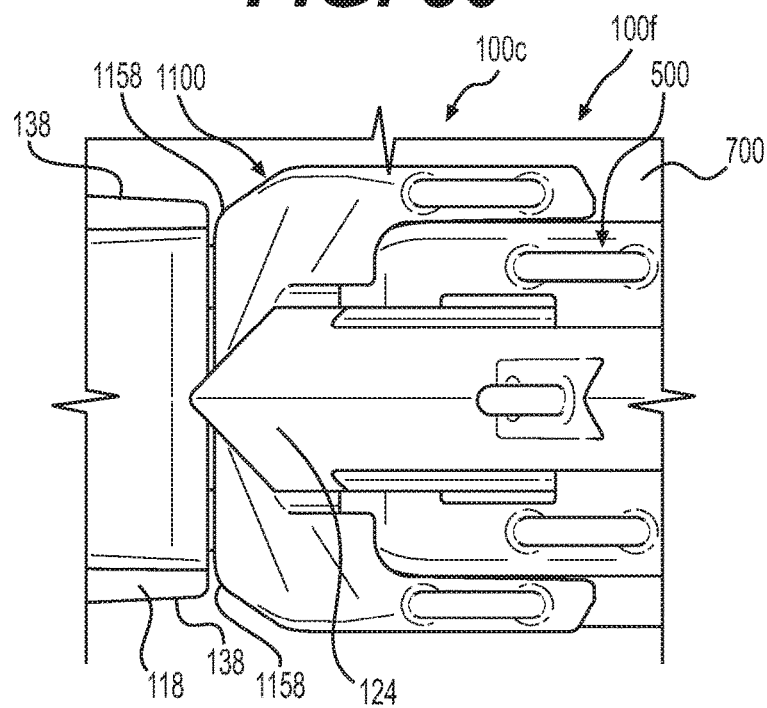
FIG. 31 is a top enlarged view of the corner tip, the side edge, the corner adapter cover, the corner adapter, and the notched based edge of FIG. 30.

FIGS. 29 thru 31 depict a work implement assembly 100f according to various embodiments of the present disclosure. The work implement assembly 100f may comprise a base edge 700, a corner adapter cover 1100 including a shell body 1102 including an exterior surface 1104 and an interior surface 1106. Referring back to FIGS. 32 thru 34. The shell body 1102 may define a vertical direction 1108, a horizontal direction 1110, and a vertical plane 1112. The shell body 1102 may also include a front face portion 1114 defining a thru-hole 1116 configured to allow a nose portion 508 of an adapter 500 to pass horizontally through the thru-hole 1116 past the interior surface 1106 and then past the exterior surface 1104.

A top bifurcated leg 1122 may extend horizontally from the front face portion 1114. The top bifurcated leg 1122 may include a shelf 1124 spanning horizontally along the front face portion 1114. The top bifurcated leg 1122 may define a top vertical slot 1126 splitting the top bifurcated leg 1122 into a right fork portion 1128 and a left fork portion 1130. The top bifurcated leg 1122 includes a V-shaped pad 1134 disposed on top of the shelf 1124. The right fork portion 1128 and the left fork portion 1130 may extend from the shelf 1124.

A bottom leg 1132 may also be provided that extends horizontally from the front face portion 1114.

In FIGS. 29 thru 31, the corner adapter 500 may be attached to the base edge 700. As best seen in FIG. 16, the corner adapter 500 may include a body 502 that includes a nose portion 508 that is configured to facilitate the attachment of a tool 118, and a first bifurcated leg 512 that includes a pair of first leg side surfaces 514. The first bifurcated leg 512 may define a vertical slot 516 splitting the first bifurcated leg 512 into a first fork portion 518 and a second fork portion 520. The body 502 may also have a second leg 522 that includes a pair of second leg side surfaces 524, a throat portion 526 that connects the legs 512, 522 and nose portion 508 together. At least one of the first fork portion 518 and the second fork portion 520 defines an aperture 528 that is configured to receive a mounting mechanism 126.

A tool 118 may be attached to the nose portion 508 in a manner as previously described herein. In FIGS. 29 thru 31, the work implement assembly 100f may also include a side edge 120. The corner adapter cover 1100 may be sandwiched between the tool 118 and the corner adapter 500.

In FIG. 30, the corner adapter 500 may include a top surface 596 and the top bifurcated leg 1122 of the corner adapter cover 1100 may rise vertically above the center adapter 500. In similar fashion, the bottom leg 1132 of the corner adapter cover 1100 may extend vertically below the corner adapter 500. The side edge 120 may be disposed in the top vertical slot 1126 of the corner adapter cover 1100 (see FIGS. 32 and 33) and in the vertical slot 516 of the corner adapter 500 (see FIG. 16).

With continued reference to FIG. 30, the tool 118 may define a tool top surface 132 and the corner adapter cover 1100 may define a corner adapter cover top surface 1154 that at least partially blends with the tool top surface 132. Furthermore, the tool 118 may define a tool bottom surface 134 while the corner adapter cover 1100 may define a corner adapter cover bottom surface 1156 that is at least partially parallel with the tool bottom surface 134.

The front face portion 1114 of the corner adapter cover 1100 may include a front radial surface 1158 interposed between the tool top surface 132 and the corner adapter cover top surface 1154, being configured to provide a flow path along the tool top surface 132 over the corner adapter cover top surface 1154.

For a similar purpose, the front face portion 1114 of the corner adapter cover 1100 may define a front face portion perimeter 1160. The front radial surface 1158 may extend completely along the front face portion perimeter 1160 (see FIG. 34). In FIG. 31, the tool 118 may include a pair of tool side surfaces 138, and the front radial surface 1158 may be configured to allow material to flow past the tool side surfaces 138 and past the corner adapter cover 1100.

Other streamlining features may be provided. For example as shown in FIG. 29, the top bifurcated leg 1122 may further define a cutout 1162 extending horizontally on top of the V-shaped pad 1134 and through the V-shaped pad 1134. The work implement assembly 100f may further comprise a side edge protector 124 attached to the side edge 120 that includes a V-shaped front portion 1164 seated in the cutout 1162. The V-shaped front portion 1164 may define a top vertex 1166 while the V-shaped pad 1134 may define a bottom vertex 1168 that is positioned proximate to the top vertex 1166. These features may allow material to flow more easily into and along the side of the work implement assembly 100*f*. Other configurations for these various features are possible and these various features may be omitted in other embodiments of the present disclosure.

Again, it should be noted that any of the dimensions, angles, surface areas and/or configurations of various features may be varied as desired or needed including those not specifically mentioned herein. Although not specifically discussed, blends such as fillets are shown to connect the various surfaces. These may be omitted in other embodiments and it is to be understood that their presence may be ignored sometimes when reading the present specification unless specifically mentioned.

INDUSTRIAL APPLICABILITY

In practice, a machine, a work implement assembly, a center adapter, a corner adapter, a load sharing block, center adapter cover, corner adapter cover, and/or a base edge may be manufactured, bought, or sold to retrofit a machine or a work implement assembly in the field in an aftermarket context, or alternatively, may be manufactured, bought, sold or otherwise obtained in an OEM (original equipment manufacturer) context.

Any of the aforementioned components may be made from any suitable material including iron, grey-cast iron, steel, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A load sharing block comprising:
   a body including:
      a flat outer surface defining a first end and a second end;
      a first arcuate outer portion extending from the first end of the flat outer surface; and
      a second arcuate outer portion extending from the second end of the flat outer surface,
         wherein the first arcuate outer portion terminates at a first free end and includes a first elliptical outer surface extending from the first free end, and
         wherein the load sharing block is configured for the flat outer surface to be spaced laterally away from a leg side surface of an adaptor.

2. The load sharing block of claim 1, wherein the first arcuate outer portion further includes a first radial surface disposed between the first elliptical outer surface and the flat outer surface.

3. The load sharing block of claim 2,
   wherein the first elliptical outer surface defines a minor axis ranging from 30 mm to 60 mm and a major axis ranging from 70 mm to 100 mm, and
   wherein the first radial surface defines a radius of curvature ranging from 50 mm to 100 mm.

4. The load sharing block of claim 1, wherein the body further includes:
   a flat inner surface offset inwardly a particular thickness from the flat outer surface, and
   a first arcuate inner portion offset inwardly the particular thickness from the first arcuate outer portion.

5. The load sharing block of claim 4,
   wherein the body defines a vertical direction perpendicular to the particular thickness and a height measured along the vertical direction,
      the height ranging from 1.5 multiplied by the particular thickness to 3.0 multiplied by the particular thickness.

6. The load sharing block of claim 1, wherein the body defines a midpoint of the flat outer surface and a plane of symmetry passing through the midpoint.

7. The load sharing block of claim 4,
   wherein the body defines a vertical direction perpendicular to the particular thickness, and
   wherein the body further includes:
      a top surface disposed along the vertical direction that forms a right angle with the flat outer surface and the first elliptical outer surface,
      a bottom surface, and
      a beveled surface leading from the bottom surface to the first arcuate inner portion and the flat inner surface.

8. The load sharing block of claim 7, wherein the beveled surface forms an obtuse bevel angle with the bottom surface at the first free end ranging from 30 degrees to 60 degrees.

9. A load sharing block comprising:
   a body including:
      a flat outer surface defining a first end and a second end;

a first arcuate outer portion extending from the first end of the flat outer surface; and
a second arcuate outer portion extending from the second end of the flat outer surface;
a flat inner surface offset inwardly a particular thickness from the flat outer surface; and
a first arcuate inner portion offset inwardly the particular thickness from the first arcuate outer portion;
wherein the load sharing block is configured for the flat outer surface to be spaced laterally away from a leg side surface of an adaptor,
wherein the first arcuate outer portion terminates at a first free end and includes a first elliptical outer surface extending from the first free end toward the flat outer surface, and
wherein the second arcuate outer portion terminates at a second free end and includes a second elliptical outer surface extending from the second free end toward the flat outer surface.

10. The load sharing block of claim 9,
wherein the first arcuate outer portion further includes a first radial surface disposed between the first elliptical outer surface and the flat outer surface, and
wherein the second arcuate outer portion further includes a second radial surface disposed between the second elliptical outer surface and the flat outer surface.

11. The load sharing block of claim 10,
wherein the second elliptical outer surface is symmetrically configured to the first elliptical outer surface,
wherein the first elliptical outer surface defines a minor axis ranging from 30 mm to 60 mm and a major axis ranging from 70 mm to 100 mm,
wherein the second radial surface is symmetrically configured to the first radial surface, and
wherein the first radial surface defines a radius of curvature ranging from 50 mm to 100 mm.

12. The load sharing block of claim 9, wherein the body defines a vertical direction perpendicular to the particular thickness and a height measured along the vertical direction, the height ranging from 1.5 multiplied by the particular thickness to 3.0 multiplied by the particular thickness.

13. The load sharing block of claim 12, wherein the body further includes:
a top surface disposed along the vertical direction that forms a right angle with the flat outer surface and the first elliptical outer surface,
a bottom surface, and
a beveled surface leading from the bottom surface to the first arcuate inner portion and the flat inner surface.

14. The load sharing block of claim 13, wherein the beveled surface forms an obtuse bevel angle with the bottom surface at the first free end ranging from 30 degrees to 60 degrees.

15. The load sharing block of claim 9, wherein the body comprises at least one of steel, cast iron, or grey-cast iron.

16. A work implement assembly comprising:
a base edge;
a center adapter configured to be attached to the base edge,
the center adapter including a body that includes:
a nose portion that is configured to facilitate the attachment of a tool;
a first leg that includes a pair of first leg opposing side surfaces, wherein the pair of first leg opposing side surfaces includes a first leg side surface and a second leg side surface;
a second leg that includes a pair of second leg opposing side surfaces; and
a throat portion that connects the legs and nose portion together,
at least one of the first leg or the second leg defining an aperture that is configured to receive a mounting mechanism,
the body defining a first top pocket that defines a first top pocket arcuate abutment surface disposed adjacent the first leg side surface,
the first leg, the second leg, and the throat portion defining a slot that includes a closed end and an open end, and
the slot defining a direction of assembly onto a work implement, a lateral direction that is perpendicular to the direction of assembly, and a vertical direction that is perpendicular to the lateral direction and the direction of assembly; and
load sharing block including an arcuate reinforcement surface engaging the first top pocket arcuate abutment surface,
wherein the load sharing block is spaced laterally away from the first leg side surface.

17. The work implement assembly of claim 16,
wherein the body further defines a second top pocket that defines a second top pocket arcuate abutment surface disposed adjacent the second leg side surface,
wherein the load sharing block is a first load sharing block, and
wherein the arcuate reinforcement surface is a first arcuate reinforcement surface,
wherein the work implement assembly further comprises a second load sharing block including:
a second arcuate reinforcement surface engaging the second top pocket arcuate abutment surface,
the first load sharing block and the second load sharing block being configured to create a wedge profile for the center adapter to be pulled into, providing support for lateral loads as well as vertical loads.

18. The work implement assembly of claim 17, wherein the second load sharing block is spaced laterally away from the second leg side surface.

19. The work implement assembly of claim 16, further comprising:
a vertical mounting mechanism disposed in the aperture of the at least one of the first leg or the second leg, wherein the arcuate reinforcement surface comprises an elliptical surface and a radial surface.

20. The work implement assembly of claim 19,
wherein the elliptical surface defines a minor axis ranging from 30 mm to 60 mm and a major axis ranging from 70 mm to 100 mm, and
wherein the radial surface defines a radius of curvature ranging from 50 mm to 100 mm.

* * * * *